(12) United States Patent
Miyabe et al.

(10) Patent No.: US 9,783,450 B2
(45) Date of Patent: Oct. 10, 2017

(54) METHOD OF PRODUCING GLASS PREFORM AND OPTICAL FIBER

(71) Applicant: FURUKAWA ELECTRIC CO., LTD., Tokyo (JP)

(72) Inventors: Ryo Miyabe, Tokyo (JP); Keiichi Aiso, Tokyo (JP); Naomi Kumano, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/810,876

(22) Filed: Jul. 28, 2015

(65) Prior Publication Data
US 2015/0329404 A1 Nov. 19, 2015

Related U.S. Application Data

(63) Continuation of application No. PCT/JP2014/050956, filed on Jan. 20, 2014.

(30) Foreign Application Priority Data

Jan. 29, 2013 (JP) .................................. 2013-014754
Jan. 29, 2013 (JP) .................................. 2013-014755

(51) Int. Cl.
*C03B 37/018* (2006.01)
*C03B 37/014* (2006.01)
*G02B 6/02* (2006.01)

(52) U.S. Cl.
CPC .... *C03B 37/01853* (2013.01); *C03B 37/0142* (2013.01); *C03B 37/01446* (2013.01);
(Continued)

(58) Field of Classification Search
CPC ........ C03B 37/01446; C03B 37/01853; C03B 2201/50
See application file for complete search history.

(56) References Cited

U.S. PATENT DOCUMENTS 3,883,336 A * 5/1975 Randall ............... C03B 19/1415
427/223
4,620,861 A * 11/1986 Berkey ............ C03B 37/01446
65/397
(Continued)

FOREIGN PATENT DOCUMENTS

EP 0026625 A2 9/1980
EP 0151438 A2 1/1985
(Continued)

OTHER PUBLICATIONS

K. Nagayama et al. "Ultra-low-loss (0.1484 dB/km) pure silica core fibre and extension of transmission distance", Electronics Letters vol. 38 No. 20, pp. 1168-1169 (2002).
(Continued)

*Primary Examiner* — Erin Snelting
(74) *Attorney, Agent, or Firm* — Oblon, McClelland, Maier & Neustadt, L.L.P.

(57) ABSTRACT

A method of producing a glass preform including: forming a porous glass soot configured by an inner deposition soot deposited on a start material and an outer deposition soot deposited outside the inner deposition soot; and sintering, after the forming, the porous glass soot while doping with fluorine to form a glass body including an inner glass portion and an outer glass layer. An amount of the fluorine, with which the inner deposition soot is doped at the sintering, is equal to or more than 0 g/cm$^3$ and less than an amount of the fluorine with which the outer deposition soot is doped.

11 Claims, 10 Drawing Sheets

(52) U.S. Cl.
CPC .......... *C03B 37/01453* (2013.01); *G02B 6/02* (2013.01); *C03B 2201/12* (2013.01); *C03B 2201/50* (2013.01); *C03B 2203/22* (2013.01); *C03B 2207/34* (2013.01); *C03B 2207/50* (2013.01)

(56) References Cited

U.S. PATENT DOCUMENTS

| | | | | |
|---|---|---|---|---|
| 5,028,246 | A | * | 7/1991 | Sarkar .................... C03B 37/014 65/382 |
| 5,055,121 | A | * | 10/1991 | Kanamori ........... C03B 37/0142 65/398 |
| 5,146,534 | A | | 9/1992 | Lines |
| 5,217,516 | A | * | 6/1993 | Ishiguro ............ C03B 37/01446 65/397 |
| 7,489,850 | B1 | * | 2/2009 | Berkey ............. C03B 37/01446 385/141 |
| 2001/0036349 | A1 | | 11/2001 | Abe et al. |
| 2005/0063663 | A1 | | 3/2005 | Anderson et al. |
| 2006/0130529 | A1 | | 6/2006 | Bookbinder et al. |
| 2012/0192593 | A1 | | 8/2012 | Haruna et al. |
| 2012/0304701 | A1 | | 12/2012 | Inoue |

FOREIGN PATENT DOCUMENTS

| | | |
|---|---|---|
| EP | 0311080 A2 | 10/1988 |
| EP | 2535319 A2 | 12/2012 |
| JP | S61215227 A | 9/1986 |
| JP | H01160839 A | 6/1989 |
| JP | H02102145 A | 4/1990 |
| JP | 2000-3235 | 1/2002 |
| JP | 2002-3235 | 1/2002 |
| JP | 3270148 | 1/2002 |
| JP | 2007-504080 | 3/2007 |
| JP | 2012-167003 | 9/2012 |
| JP | 2012-250887 | 12/2012 |

OTHER PUBLICATIONS

Office Action issued Oct. 7, 2014 in corresponding Japanese Application No. 2014-532160 with English Translation.
International Search Report issued Apr. 22, 2014 in PCT/JP2014/050956 filed Jan. 20, 2014.
Supplementary European Search Report issued Jul. 28, 2016 in U.S. Appl. No. 14/745,344, filed Jan. 20, 2014.

* cited by examiner

FIG.8

METHOD OF PRODUCING GLASS PREFORM AND OPTICAL FIBER

CROSS-REFERENCE TO RELATED APPLICATIONS

This application is a continuation of PCT International Application No. PCT/JP2014/050956 filed on Jan. 20, 2014 which claims the benefit of priority from Japanese Patent Application No. 2013-014754 and No. 2013-014755, both filed on Jan. 29, 2013, the entire contents of which are incorporated herein by reference.

BACKGROUND OF THE INVENTION

1. Field of the Invention

The present invention relates to a method of producing a glass preform and an optical fiber.

2. Description of the Related Art

Conventionally, reduction in transmission loss is required for a long haul transmission fiber. To address this, in recent years, a method of restraining Rayleigh scattering by using a pure silica core has been studied. K. Nagayama et Al., Electron. Lett., 38, PP. 1168-1169 (2002) (hereinafter to be referred to as Non-Patent Literature 1) proposes a structure in which a light is guided by decreasing a refractive index of a cladding layer by disposing the cladding layer doped with fluorine around a pure silica core. Japanese Patent No. 3270148 (hereinafter to be referred to as Patent Literature 1) describes a structure in which a core portion of an optical fiber is doped with an alkali metal and a cladding portion is doped with fluorine.

SUMMARY OF THE INVENTION

It is an object of the present invention to at least partially solve the problems in the conventional technology.

A method of producing a glass preform according to one aspect of the present invention includes: forming a porous glass soot configured by an inner deposition soot deposited on a start material and an outer deposition soot deposited outside the inner deposition soot; and sintering, after the forming, the porous glass soot while doping with fluorine to form a glass body including an inner glass portion and an outer glass layer. An amount of the fluorine, with which the inner deposition soot is doped at the sintering, is equal to or more than 0 g/cm$^3$ and less than an amount of the fluorine with which the outer deposition soot is doped.

An optical fiber according to another aspect of the present invention includes: an inner glass portion positioned at a center of a cross section; an first outer glass layer surrounding the inner glass portion; and a second outer glass layer surrounding the first outer glass layer, in which an outer diameter of the inner glass portion is equal to or more than 7.5 μm and equal to or less than 11.5 μm, and an outer diameter of the first outer glass layer is equal to or more than twice the outer diameter of the inner glass portion and equal to or less than 4.5 times the outer diameter of the inner glass portion, a relative refractive index difference of the inner glass portion with respect to the first outer glass layer is equal to or more than 0.25% and equal to or less than 0.5%, and a relative refractive index difference of the first outer glass layer with respect to a pure silica glass is equal to or more than −0.5% and equal to or less than −0.25%, a production interface is not formed between the inner glass portion and the first outer glass layer, an amount of fluorine with which the inner glass portion is doped is equal to or more than 0 g/cm3 and less than an amount of fluorine with which the first outer glass is doped, the optical fiber is doped with an alkali metal element, and a transmission loss at a wavelength of 1383 nm is equal to or less than 1.0 dB/km and a transmission loss at a wavelength of 1550 nm is equal to or less than 0.18 dB/km.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a configuration diagram showing an essential part of a vitrification furnace and an aerosol generator used for a third embodiment of the present invention;

DETAILED DESCRIPTION OF THE PREFERRED EMBODIMENTS

Figure 1:
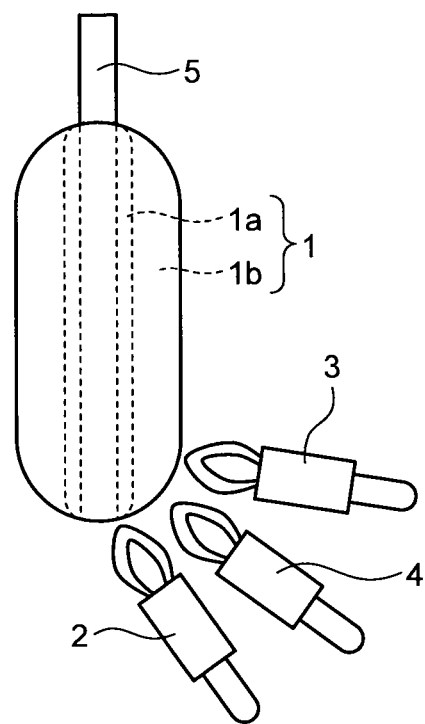
FIG. 1 is a schematic diagram showing an essential part of a VAD device according to a first embodiment of the present invention.

Hereafter embodiments according to the present invention will be explained in detail with reference to the drawings. In all the drawings, identical or equivalent elements are given same reference numerals. The present invention is not limited to the embodiment. Any terms not specifically defined in the description follow definitions and measuring methods of the ITU-T (International Telecommunication Union Standardization Sector) G. 650.1.

As described in Non-Patent Literature 1 and Patent Literature 1, a low loss optical fiber may be of a configuration in which a cladding doped with fluorine is disposed around a core made of pure silica glass or around a core doped with alkali metal. In order to produce a long optical fiber, a large core glass preform must be produced. As a method of producing such a core glass preform, it is preferable to adapt vapor phase axial deposition (VAD) method. On the other hand, in order to restrain an OH group from being produced at an interface between a core portion and a cladding portion in the VAD method, the core portion and the cladding portion must be synthesized together.

Since it was extremely difficult to dope with fluorine in the VAD method, doping with fluorine was necessary at a vitrification step. However, since a refractive index of the core portion decreases if the core portion is doped with fluorine, there was a problem that a relative refractive index difference between the core portion and the cladding portion could not have been obtained for guiding a light sometimes.

In contrast, according to the embodiment described below, it is possible to provide an advantage that a method of producing a glass preform that is capable of doping a cladding portion with more fluorine than that of the core portion, and an optical fiber, in a case of synthesizing the core portion and the cladding portion together in the glass preform.

To start with, a vapor phase axial deposition (VAD) device for use in a first embodiment of the present invention will be explained. FIG. 1 shows an essential part of the VAD device for use in the first embodiment.

As shown in FIG. 1, the VAD device for use in the first embodiment includes a hoisting mechanism (not shown in the drawings) hoisting, while holding and rotating, a target rod 5 as a start material and a plurality of burners 2, 3, and 4 having concentric structures for depositing a silica glass particle, or conducting a firing process, on the target rod 5. A porous glass soot 1 is formed around an outer periphery of the target rod 5 and is made of an inner deposition soot 1a synthesized inside and an outer deposition soot 1b synthesized outside the inner deposition soot 1a.

The burner 2 in the VAD device is a burner for synthesizing the inner deposition soot 1a. Aqueous solution or the like of an alkali metal chloride made in mist state by ultrasonic waves are made pass through the burner 2 by using, for example, primary material gas such as silicon tetrachloride or the like, hydrogen ($H_2$) gas as combustible gas, oxygen ($O_2$) gas as combustion supporting gas, and carrier gas. The burner 3 is a burner for synthesizing the outer deposition soot 1b. For example, primary material gas, carrier gas, $H_2$ gas, and $O_2$ gas or the like are made pass through the burner 3. The burner 4 is a burner for firing a border portion of the inner deposition soot 1a and the outer deposition soot 1b. $H_2$ gas and $O_2$ gas are made pass through the burner 4. A synthetic silica glass particle is blown to and deposited on the target rod 5 by a hydrolysis reaction in flame of these gases; thus, the inner deposition soot 1a and the outer deposition soot 1b are formed.

Figure 2:
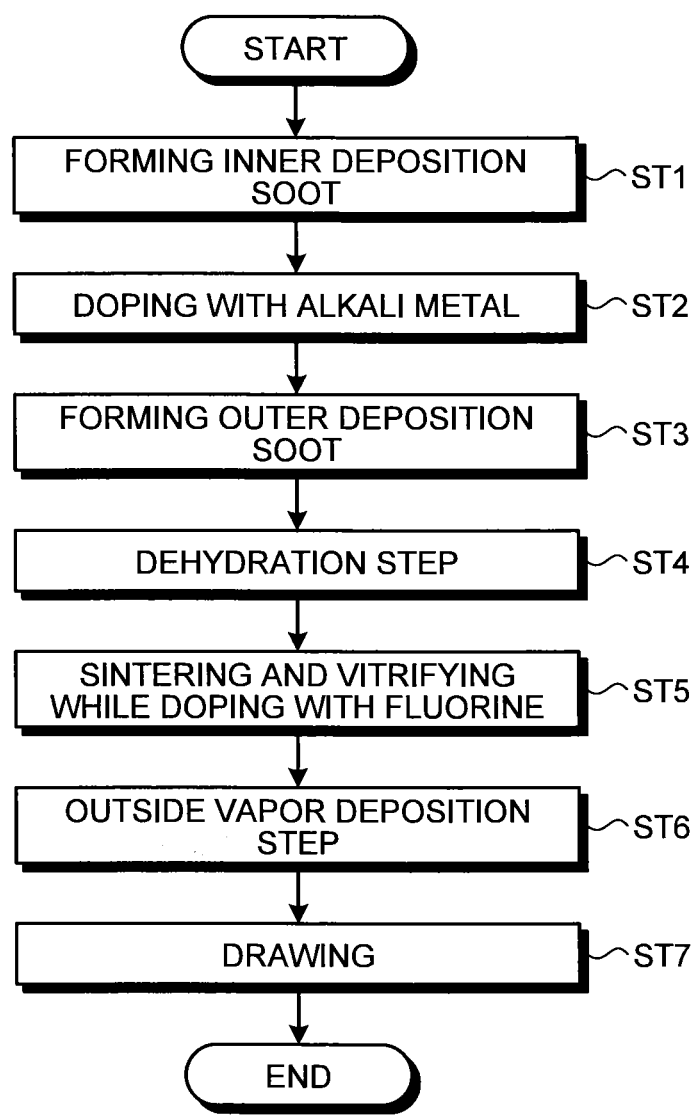
FIG. 2 is a flowchart showing a production method according to the first embodiment of the present invention.

Hereafter, a succession of production method including production of a porous glass soot by the VAD method using the VAD device configured as above, a production of a glass preform from the porous glass soot via a glass body, and a production of an optical fiber from the glass preform will be explained. FIG. 2 is a flowchart of a production method according to the first embodiment.

That is, the inner deposition soot 1a is formed (steps ST1 and ST2) by injecting a silica glass particle and misty aqueous solution or the like from the burner 2 to the target rod 5 as shown in FIG. 2, and the silica glass particle is deposited while doping with, for example, lithium (Li), potassium (K), sodium (Na), rubidium (Rb), or cesium (Cs). Following the formation of the inner deposition soot 1a, the outer deposition soot 1b is formed (step ST3) by injecting the silica glass particle from the burner 3 to an outside of the inner deposition soot 1a to deposit the silica glass particle.

As described above, since it is possible to decrease a fictive temperature by doping the inner deposition soot 1a with the alkali metal element when drawing and extending at the production of the optical fiber which will be explained later, and since it is possible to mitigate distortion along a radial direction of the optical fiber, a transmission loss of the optical fiber can be reduced. It is not preferable that, if the concentration of the alkali metal doped with the inner deposition soot 1a is less than 10 wtppm at a time of the inner deposition soot 1a becomes an inner glass of the glass preform, the effect of reducing the fictive temperature by the alkali metal weakens in the drawing step when producing the optical fiber and the transmission loss increases by the distortion in a highly tensile drawing condition. On the other hand, if the concentration of the alkali metal of the inner glass is more than 10000 wtppm at a time when the inner deposition soot 1a becomes the inner glass of the glass preform later, a region becoming a core portion of the optical fiber tends to be crystallized easily when further producing the optical fiber as a final product. Therefore, it is not preferable because the region may be cracked possibly in a vitrification step which will be explained later. Therefore, it is preferable that the concentration of the alkali metal doped with the inner deposition soot 1a be equal to or more than 10 wtppm and equal to or less than 10000 wtppm. When the concentration of the alkali metal exceeds 5000 wtppm at a time when the inner deposition soot 1a becomes the inner glass of the glass preform, Rayleigh scattering increases in the produced optical fiber by the alkali element. Therefore, it is more preferable that the concentration of the alkali metal with which the inner deposition soot 1a is doped be equal to or more than 10 wtppm and equal to or less than 5000 wtppm.

If the inner deposition soot 1a is doped with chlorine (Cl) when forming the inner deposition soot 1a by the burner 2, the viscosity of the region which will become the core portion in a subsequent step can be decreased. Hereby it is possible to mitigate the distortion in the finally produced optical fiber, and it is possible to reduce the transmission loss.

The inner deposition soot 1a can be doped with aluminum (Al), germanium (Ge), or phosphor (P) or the like. Hereby it is possible to adjust a refractive index of an inner glass portion 11a formed later from the inner deposition soot 1a and a refractive index of an outer glass layer 12a as a first outer glass layer formed later from the outer deposition soot 1b synthesized around outside of the inner glass portion 11a.

Also, in parallel with the above-described steps ST1, ST2, and ST3, at least an outer periphery portion of the inner deposition soot 1a is made contract by flame injected from the burner 4 disposed between the burner 2 and the burner 3. Although only $H_2$ gas and $O_2$ gas are made pass through the burner 4 in the first embodiment, a mist, made by ultrasonic waves, of aqueous solution of $SiCl_4$ and potassium nitrate ($KNO_3$) or the like may be made pass simultaneously.

The porous glass soot 1 in which the outer deposition soot 1b is deposited on the outside of the inner deposition soot 1a is produced by the above-described steps ST1, ST2, and ST3. Since the outer periphery portion of the inner deposition soot 1a is contracted in such production of the porous glass soot 1 by synthesizing the inner deposition soot 1a and the outer deposition soot 1b together, at least an interface (border portion) with the outer deposition soot 1b is fired and contracted. Heating power can be adjusted by adjusting a flow amount of $H_2$ gas and $O_2$ gas flown from the burner 2 of the VAD device, and the heating power can also be adjusted by adjusting a flow amount of $H_2$ gas and $O_2$ gas flown from the burner 4. Hereby it is possible to fire the inner deposition soot 1a not only at the border portion with the outer deposition soot 1b but also entirely, and it is possible to increase the soot density of the inner deposition soot 1a uniformly and entirely.

Figure 3:
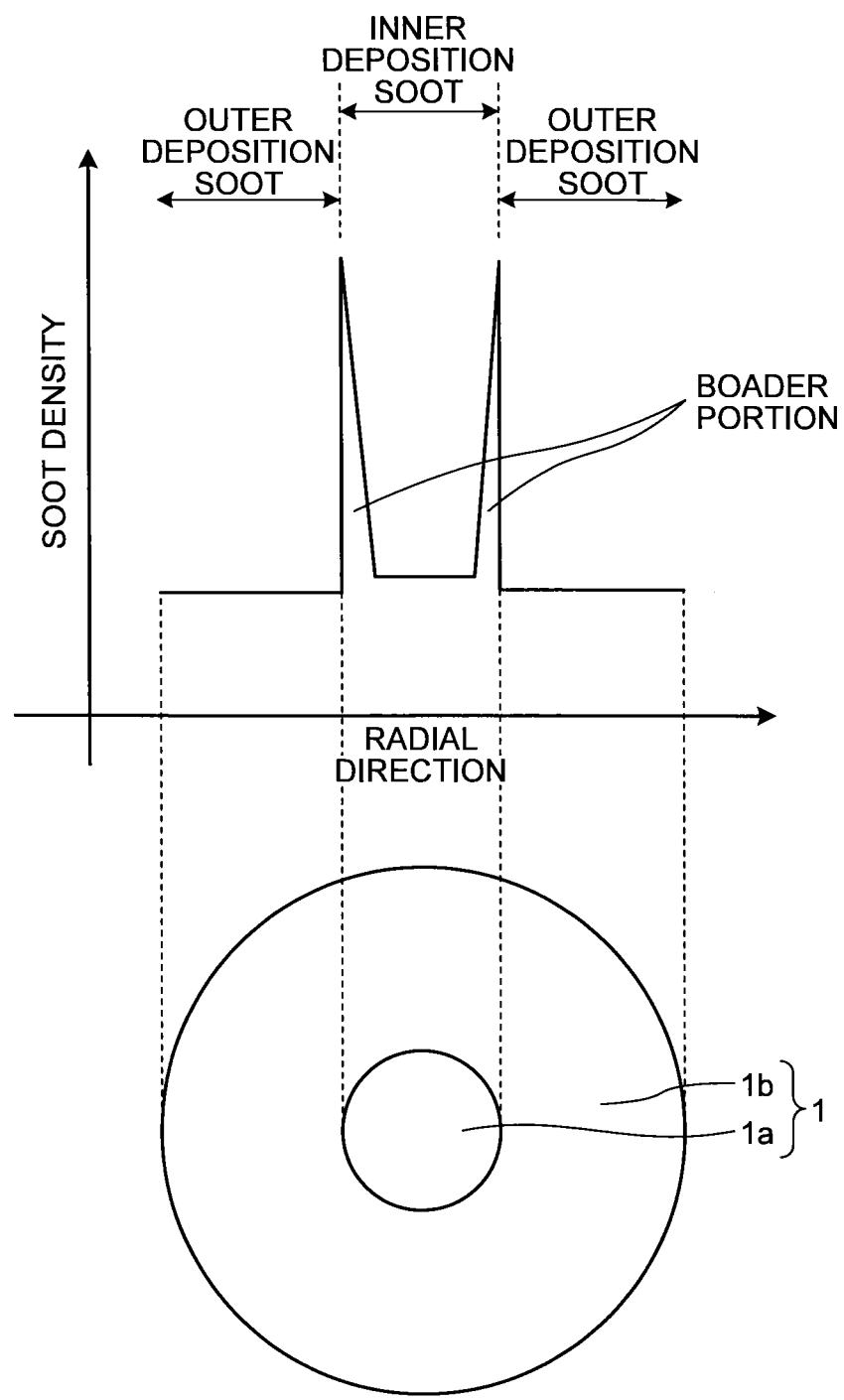
FIG. 3 is a graph showing a soot density along a radial direction of a porous glass soot produced by the production method according to the first embodiment of the present invention.

FIG. 3 is a graph showing an example of soot density distribution of the inner deposition soot 1a and the outer deposition soot 1b along the radial direction of the porous glass soot 1 produced as described above. As shown in FIG. 3, since at least the outer periphery portion of the inner deposition soot 1a is contracted by the flame injected from the burner 4 in the porous glass soot 1 according to the first embodiment, the soot density at the border portion of the inner deposition soot 1a and the outer deposition soot 1b is high relative to that of other portion. Thus, the density of the soot density at least the border portion of the inner deposition soot 1a and the outer deposition soot 1b is higher than that of the other portion. The soot density increased at the border portion enables, at a vitrification while doping with fluorine in the subsequent sintering step, restraining the fluorine from entering the inner deposition soot 1a from the outer deposition soot 1b and preventing most of the fluorine from being doped.

To be more specific, in a case where at least the maximum value of the soot density highly increased at at least the border portion of the inner deposition soot 1a and the outer deposition soot 1b, that is, the maximum soot density is less than 0.7 g/cm$^3$, it is not preferable because the amount of the fluorine entering the inner deposition soot 1a increases in the subsequent sintering step. On the other hand, if the maximum soot density exceeds 1.7 g/cm$^3$, it is not preferable because a closed pore is produced at the border portion. Therefore, it is preferable that the maximum soot density at the border portion of the inner deposition soot 1a and the outer deposition soot 1b be equal to or more than 0.7 g/cm$^3$ and equal to or less than 1.7 g/cm$^3$, and it is more preferable that the maximum soot density be equal to or more than 1.0 g/cm$^3$ and equal to or less than 1.7 g/cm$^3$.

Meanwhile it is not preferable that, more specifically, an average soot density of the outer deposition soot 1b be equal to or less than 0.15 g/cm$^3$ because the porous glass soot tends to collapse easily in the vitrification step. On the other hand, it is not preferable that the average soot density be equal to or more than 0.7 g/cm$^3$ because the amount of doped fluorine decreases extremely, and thus, a relative refractive index difference of the inner glass with respect to the outer glass in the produced glass preform is less than a predetermined relative refractive index difference required for the optical fiber produced from the glass preform. Therefore, it is preferable that the average soot density of the outer deposition soot 1b be equal to or more than 0.15 g/cm$^3$ and less than 0.7 g/cm3.

Subsequently, as shown in FIG. 2, the porous glass soot 1 is disposed in the vitrification furnace (not shown in the drawings) and a dehydration step is conducted at a predetermined temperature (step ST4). Subsequently, a sintering and vitrifying are conducted while doping with fluorine at a temperature higher than the predetermined temperature at the dehydration step and in an atmosphere of a mixture gas of, for example, silicon tetrafluoride (SiF$_4$) gas and helium (He) gas (step ST5).

Figure 4:
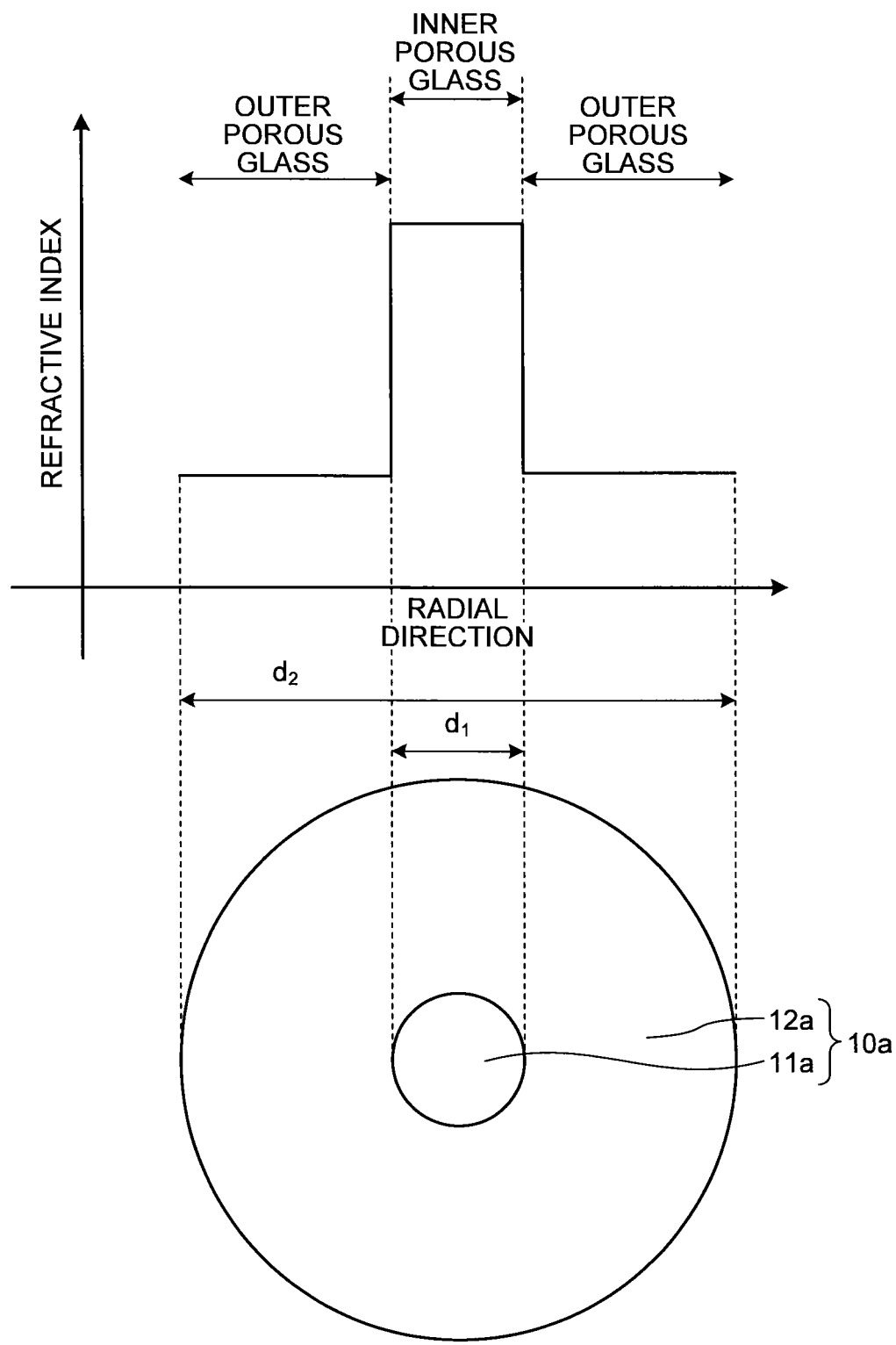
FIG. 4 is a graph showing a refractive index along a radial direction of a glass body produced by the production method according to the first embodiment of the present invention.

FIG. 4 shows a refractive index distribution of a glass body 10a produced from the porous glass soot 1 as described above. As shown in FIG. 4, in the glass body 10a, the inner glass portion 11a is formed from the inner deposition soot 1a and the outer glass layer 12a is formed from the outer deposition soot 1b. Since the soot density of at least the border portion of the inner deposition soot 1a and the outer deposition soot 1b is higher than that of the other portion, the outer glass layer 12a is doped with a plenty of fluorine, and the amount of the fluorine with which the inner glass portion 11a is doped is restrained. Since the soot density of at least the border portion of the inner deposition soot 1a and the outer deposition soot 1b of the porous glass soot 1 is higher than that of other portion, the alkali metal with which the inner glass portion 11a is doped is prevented from dispersion in the outer glass layer 12a.

Therefore, in the glass body 10a according to the first embodiment, the amount of fluorine with which the outer glass layer 12a is doped is more than the amount of fluorine with which the inner glass portion 11a is doped. Hereby the refractive index of the outer glass layer 12a is less than the refractive index of the inner glass portion 11a. The refractive index of the inner glass portion 11a and the refractive index of the outer glass layer 12a are reflected respectively on refractive indices of the core portion and the cladding portion of the optical fiber which will be produced later.

In the produced glass body 10a, an outer diameter $d_1$ of the inner glass portion 11a and an outer diameter $d_2$ of the outer glass layer 12a are determined as follows. That is, in a case where the outer diameter $d_2$ of the outer glass layer 12a is less than two times the outer diameter $d_1$ of the inner glass portion 11a, when an OH group is produced on a surface of the glass body 10a in a later step, the affection by the OH group causes a loss by the OH group of a finally drawn optical fiber, that is, an increase in a transmission loss at a wavelength of 1383 nm. It is not preferable that the outer diameter $d_2$ of the outer glass layer 12a be set to be more than 4.5 times the outer diameter $d_1$ of the inner glass portion 11a since the soot tends to slide on, and fall from, the interface by influence of gravity in accordance with difference between the soot density of the inner deposition soot 1a and the soot density of the outer deposition soot 1b when conducting sintering and vitrifying to the glass body 10a. Therefore, it is preferable that a formula (1) below hold true between the outer diameter $d_2$ of the outer glass layer 12a and the outer diameter $d_1$ of the inner glass portion 11a.

$$4.5 \times d_1 \geq d_2 \geq 2 \times d_1 \quad (1)$$

It is preferable that the outer diameter $d_2$ of the outer glass layer 12a be more than three times the outer diameter $d_1$ of the inner glass portion 11a since most of affection of the OH group can be eliminated in a later step. Therefore, it is more preferable that a formula (2) below hold true between the outer diameter $d_2$ of the outer glass layer 12a and the outer diameter $d_1$ of the inner glass portion 11a.

$$4.5 \times d_1 \geq d_2 \geq 3 \times d_1 \quad (2)$$

Figure 5:
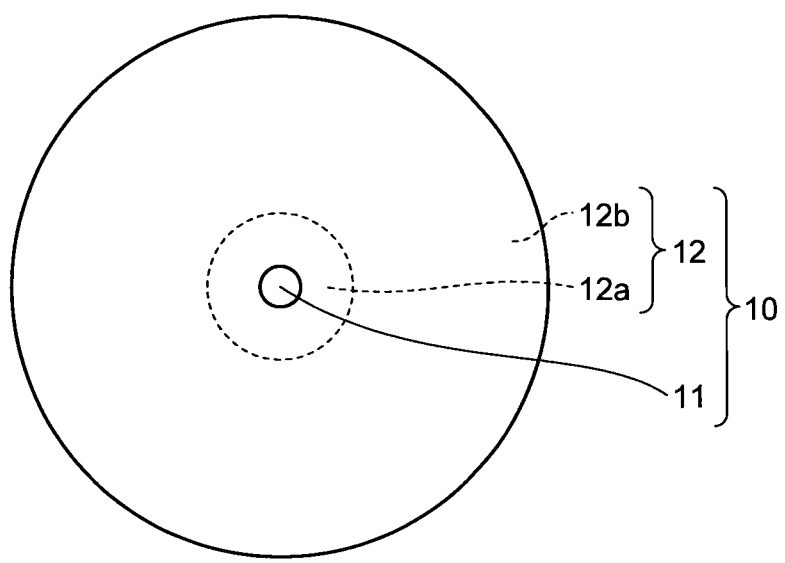
FIG. 5 is a cross-sectional view showing a glass preform produced by the production method according to the first embodiment of the present invention.

Subsequently, a so-called outside vapor deposition step is conducted (step ST6) in the vitrification furnace in which a second porous glass layer is deposited in a mixed atmosphere of SiF$_4$ gas and He gas and sintering and vitrifying are conducted twice so that a refractive index of the second porous glass layer is equivalent to that of the outer glass layer 12a. Hereby a glass preform 10 shown in FIG. 5 is produced. FIG. 5 shows a cross-sectional shape of the glass preform 10 produced in accordance with the first embodiment. As shown in FIG. 5, an inner glass 11 which becomes a core portion of an optical fiber is formed from the inner glass portion 11a. An outer glass 12 is formed from the outer glass layer 12a as the first outer glass layer and an outer glass layer 12b as the second outer glass layer formed from the second porous glass layer. Hereby the glass preform 10 is produced which is configured by the inner glass 11 and the outer glass 12.

In accordance with such production method, the inner glass portion 11a and the outer glass layer 12a are formed so that there is not a production interface therebetween. Hereby a production interface does not exist between the inner glass 11 and the outer glass 12. The production interface herein means an interface between two glass layers in a case where a surface of the glass layers is exposed temporally to an atmosphere containing moisture such as air in a production step, and then the glass layers is formed on the surface. Such production interface is equivalent to an interface between a first glass layer and a second glass layer in a case where a porous glass soot is deposited to vitrify the porous glass soot to form the first glass layer and a porous glass soot is deposited on a surface of the first glass layer to vitrify the porous glass soot to form the second glass layer. By contrast, since formation of the outer deposition soot 1b follows the formation of the inner deposition soot 1a by the VAD method in the above described production method, a production interface is not formed between the inner glass portion 11a and the outer glass layer 12a that are produced later.

Subsequently, the above-described and produced glass preform 10 is drawn and extended at a predetermined speed (step ST7). Hereby the optical fiber is produced in which the inner glass 11 becomes the core portion and the outer glass 12 becomes the cladding portion. In the optical fiber produced according to the first embodiment, a transmission loss at a wavelength of 1383 nm is equal to or less than 1.0 dB/km, and more preferably, equal to or less than 0.4 dB/km. Similarly, in the optical fiber according to the first embodiment, a transmission loss at a wavelength of 1550 nm is equal to or less than 0.18 dB/km. Hereby the transmission loss satisfies the standard of ITU-TG652D.

According to the first embodiment explained above, before vitrifying the porous glass soot 1 formed in two layers of the inner deposition soot 1a and the outer deposition soot 1b which differ in composition by using at least the three burners 2, 3, and 4 as a VAD device, since doping amounts of fluorine differ so that the amount of fluorine with which the inner deposition soot 1a is doped is less than the amount of fluorine with which the outer deposition soot 1b is doped by increasing the density of at least the border portion of the inner deposition soot 1a and the outer deposition soot 1b, it is possible to produce the glass preform 10 of which amount of fluorine with which the outer glass 12 is doped is more than that of the inner glass 11 and of which refractive index is less than that of the inner glass 11.

Hereafter examples based on the above-described first embodiment are explained. Table 1 shows state of potassium, method of doping with fluorine, soot density, $d_1/d_2$ of outer-inner-diameter ratio, potassium concentration, relative refractive index difference with reference to pure silica glass, core diameter, transmission loss, and as to whether or not firing burner (burner 4) is used (hereafter various conditions) for each of Examples respectively.

TABLE 1

| | State of potassium | Method of doping with fluorine | Soot density [g/cm³] | | | | Outer-diameter-inner-diameter ratio $d_1/d_2$ |
|---|---|---|---|---|---|---|---|
| | | | Interface | Inner average | Inner maximum | Outer | |
| Example 1 | KCl in mist state | A | 1.1 | 0.21 | 1.1 | 0.18 | 1/3 |
| Example 2-1 | KCl in aerosol state | A | 1.05 | 0.2 | 1.05 | 0.18 | 1/3.5 |
| Example 2-2 | KCl in aerosol state | A | 1.05 | 0.2 | 1.05 | 0.18 | 1/3.5 |
| Example 3 | KCl in mist state | A | 1.1 | 0.2 | 1.1 | 0.18 | 1/2 |
| Example 4 | KCl in aerosol state | B | 0.9 | 0.8 | 0.9 | 0.35 | 1/2.5 |
| Example 5 | KCl in aerosol state | B | 1.15 | 1.1 | 1.15 | 0.35 | 1/2.5 |
| Example 6-1 | KCl in aerosol state | A | 1.05 | 0.2 | 1.05 | 0.18 | 1/3 |
| Example 6-2 | KCl in aerosol state | A | 1.05 | 0.2 | 1.05 | 0.18 | 1/3 |
| Example 6-3 | KCl in aerosol state | A | 1.05 | 0.2 | 1.05 | 0.18 | 1/3 |
| Example 6-4 | KCl in aerosol state | A | 1.05 | 0.2 | 1.05 | 0.18 | 1/3 |
| Example 6-5 | KCl in aerosol state | A | 1.05 | 0.2 | 1.05 | 0.18 | 1/3 |
| Example 6-6 | KCl in aerosol state | A | 1.05 | 0.2 | 1.05 | 0.18 | 1/3 |
| Example 6-7 | KCl in aerosol state | A | 1.05 | 0.2 | 1.05 | 0.18 | 1/3 |
| Example 6-8 | KCl in aerosol state | A | 1.05 | 0.2 | 1.05 | 0.18 | 1/3 |
| Example 6-9 | KCl in aerosol state | A | 1.05 | 0.2 | 1.05 | 0.18 | 1/3 |
| Example 6-10 | KCl in aerosol state | A | 1.05 | 0.2 | 1.05 | 0.18 | 1/3 |
| Example 6-11 | KCl in aerosol state | A | 1.05 | 0.2 | 1.05 | 0.18 | 1/3 |
| Example 7 | KCl in mist state | A | 1.1 | 0.215 | 1.1 | 0.18 | 1/3 |

TABLE 1-continued

| | | | | | | | |
|---|---|---|---|---|---|---|---|
| Example 8 | KNO₃ in mist state | A | 1.1 | 0.21 | 1.1 | 0.18 | 1/3 |
| Example 9 | KCl in mist state | A | 1.1 | 0.21 | 1.1 | 0.18 | 1/1.9 |
| Example 10-1 | KCl in mist state | A | Equal to or more than 0.7 | 0.4 | 1 | 0.43 | 1/4.5 |
| Example 10-2 | KCl in mist state | A | Equal to or more than 0.7 | 0.4 | 1 | 0.43 | 1/4.5 |
| Example 11 | KCl in aerosol state | C | 0.18⇒0.73 | 0.18⇒0.73 | 0.19⇒0.75 | 0.18 | 1/3 |
| Example 12 | KCl in aerosol state | C | 0.18⇒0.82 | 0.18⇒0.82 | 0.19⇒0.84 | 0.18 | 1/3 |
| Example 13 | KCl in aerosol state | C | 0.18⇒0.9 | 0.9 | 0.19⇒0.92 | 0.18 | 1/3 |
| Comparison example 1 | KCl in mist state | D | — | — | — | — | — |
| Comparison example 2 | KCl in mist state | A | 1.1 | 0.65 | 1.1 | 0.62 | 1/3 |

| | | Relative refractive index difference with respect to silica glass [%] | | | Transmission loss [dB/km] | | |
|---|---|---|---|---|---|---|---|
| | Potassium concentration [wtppm] | Inner glass portion | Outer glass portion | Core diameter [μm] | Wavelength 1383 mm | Wavelength 1550 mm | Firing burner |
| Example 1 | 300 | −0.05 | −0.36 | 10.2 | 0.35 | 0.17 | Used |
| Example 2-1 | 400 | −0.06 | −0.36 | 10.3 | 0.32 | 0.167 | Used |
| Example 2-2 | 400 | −0.06 | −0.36 | 10.3 | 0.32 | 0.165 | Used |
| Example 3 | 300 | −0.05 | −0.36 | 10.2 | 0.39 | 0.171 | Used |
| Example 4 | 120 | −0.12 | −0.39 | 10.8 | 0.37 | 0.17 | Used |
| Example 5 | 120 | −0.12 | −0.39 | 10.8 | 0.37 | 0.17 | Used |
| Example 6-1 | 250 | −0.17 | −0.5 | 9.8 | 0.33 | 0.166 | Used |
| Example 6-2 | 420 | −0.13 | −0.45 | 10 | 0.32 | 0.164 | Used |
| Example 6-3 | 50 | 0 | −0.25 | 11.3 | 0.33 | 0.167 | Used |
| Example 6-4 | 80 | −0.09 | −0.4 | 10.2 | 0.32 | 0.163 | Used |
| Example 6-5 | 10 | −0.05 | −0.35 | 10.3 | 0.35 | 0.179 | Used |
| Example 6-6 | 550 | −0.02 | −0.43 | 8.8 | 0.35 | 0.168 | Used |
| Example 6-7 | 2000 | 0 | −0.5 | 8 | 0.39 | 0.17 | Used |
| Example 6-8 | 10000 | −0.05 | −0.4 | 9.6 | 0.4 | 0.18 | Used |
| Example 6-9 | 7500 | −0.06 | −0.35 | 10.5 | 0.38 | 0.178 | Used |
| Example 6-10 | 5000 | −0.11 | −0.43 | 10 | 0.36 | 0.174 | Used |
| Example 6-11 | 1500 | −0.03 | −0.37 | 9.7 | 0.35 | 0.169 | Used |
| Example 7 | 300 | 0.02 | −0.36 | 9.2 | 0.35 | 0.17 | Used |
| Example 8 | 5 | −0.05 | −0.36 | 10.8 | 0.38 | 0.181 | Used |
| Example 9 | 300 | −0.05 | −0.36 | 10.8 | 0.42 | 0.171 | Used |
| Example 10-1 | 1200 | −0.11 | −0.36 | 11.2 | 0.36 | 0.169 | Unused |
| Example 10-2 | 1200 | −0.11 | −0.36 | 11.2 | 0.36 | 0.167 | Unused |
| Example 11 | 1000 | −0.05 | −0.36 | 10.2 | 0.34 | 0.166 | Unused |
| Example 12 | 4000 | −0.02 | −0.36 | 9.7 | 0.34 | 0.167 | Unused |

TABLE 1-continued

| | | | | | | | |
|---|---|---|---|---|---|---|---|
| Example 13 | 170 | −0.01 | −0.36 | 9.6 | 0.35 | 0.166 | Unused |
| Comparison example 1 | 300 | 0 | −0.31 | 10.2 | Equal to or more than 3 | 0.169 | — |
| Comparison example 2 | 350 | −0.05 | −0.15 | — | — | — | — |

In Examples, primary material gas, for example, silicon tetrachloride ($SiCl_4$) gas; $H_2$ gas, $O_2$ gas, and Argon (Ar) gas; and potassium chloride solution made misty by ultrasonic waves or one of KCl made in aerosol by using He gas as carrier gas and potassium nitrate ($KNO_3$) made in mist state are passed through the burner 2 in the VAD device shown in FIG. 1. Hereby the inner deposition soot 1a is formed. Primary material gas, for example, $SiCl_4$ gas, $H_2$ gas, $O_2$ gas, and Ar gas are passed through the burner 3. Hereby the outer deposition soot 1b is formed.

In the soot density distribution shown in FIG. 3, various densities in Examples are within a range equal to or more than 0.18 g/cm³ and equal to or less than 1.1 g/cm³ of maximum soot density (interface in Table 1) at a border portion of the inner deposition soot 1a and the outer deposition soot 1b of the porous glass soot 1 as shown in Table 1. In these cases, an average soot density (in Table 1, inner average) of the inner deposition soot 1a including the border portion at which the soot density is maximum varies from equal to or more than 0.2 g/cm³ to equal to or less than 1.1 g/cm³. The maximum soot density (in Table 1, inner maximum) of the inner deposition soot 1a varies from equal to or more than 0.9 g/cm³ to equal to or less than 1.15 g/cm³. An average soot density (in Table 1, outer) of the outer deposition soot 1b varies from equal to or more than 0.18 g/cm³ to equal to or less than 0.43 g/cm³.

A dehydration step is conducted to the porous glass soot 1 at, for example, a temperature of 1100° C. in the vitrification furnace. Subsequently, a sintering-and-vitrifying step is conducted while doping with fluorine in a mixed-gas atmosphere of $SiF_4$ gas and He gas at a processing temperature higher than that of the dehydration step, for example, temperature of 1350° C. to produce the glass body 10a. In Table 1 and with regard to the method of doping with fluorine, "A" indicates a case (corresponding to FIG. 3) of increasing the soot density at the interface of the core portion and the cladding portion and "B" indicates a case (corresponding to FIG. 6) of increasing the soot density of the entire core portion.

It was confirmed that, in the glass body 10a produced as described above, the relative refractive index difference of the inner glass portion 11a with respect to the pure silica glass is equal to or more than −0.17% and equal to or less than 0.02%. That is, it was confirmed that an amount of fluorine with which the inner glass portion 11a was doped was low. On the other hand, an average relative refractive index difference of the glass body 10a with respect to the pure silica glass of the outer glass layer 12a was equal to or more than −0.5% and equal to or less than −0.25%. As described above, in this example, it was confirmed that a refractive index distribution shown in FIG. 4 was obtained. A ratio of the outer diameter $d_2$ of the outer glass layer 12a with respect to the outer diameter $d_1$ of the inner glass portion 11a (outer-inner-diameter ratio $d_1/d_2$) was 1/1.9 to 1/4.5. Analyses was conducted to an element with which the inner glass portion 11a was doped to each of Example and showed that potassium (K) was detected in various doping concentration of 5 wtppm to 10000 wtppm.

Subsequently, a so called outside vapor deposition step was conducted, in which sintering and vitrifying were conducted twice outside the glass body 10a in a mixed atmosphere of $SiF_4$ gas and He gas in the vitrification furnace to form the outer glass layer 12b as shown in FIG. 5 so that the refractive index of the outer glass layer 12b is equivalent to the refractive index of the outer glass layer 12a. Hereby the glass preform 10 is produced. It is preferable that the ratio of the core diameter of the inner glass 11 with respect to the outer diameter of the glass preform 10 in the glass preform 10 produced as described above be 7.5 to 11.5:125, and more preferably the ratio be 8.0 to 11.3:125 so as to be equivalent to a ratio of the core diameter and the outer diameter of the optical fiber to be produced.

An optical fiber of which outer diameter is 125 μm is produced by conducting draw and extension of the glass preform 10 produced as described above at, for example, a speed of 1200 m/min. The inner glass 11 forms the core portion of the optical fiber, and its core diameter is equal to or more than 7.5 μm and equal to or less than 11.5 μm, and preferably, equal to or more than 8.0 μm and equal to or less than 11.3 μm. It was confirmed that, in the produced optical fiber, a transmission loss at a wavelength of 1383 nm was 0.32 to 0.42 dB/km, a transmission loss at a wavelength of 1550 nm was 0.163 to 0.180 dB/km, which were within the standard of ITU-TG652D. A relative refractive index difference of the core portion of the optical fiber with respect to the pure silica glass was equal to or more than −0.17% and equal to or less than 0.02%, and an average relative refractive index difference of the cladding portion with respect to the pure silica glass was equal to or more than −0.5% and equal to or less than −0.25%.

An optical fiber cable was produced, by using the optical fiber produced as described above, as an optical transmission medium of which length is, for example, 50 km, and it was confirmed that a transmission loss did not increase both at a wavelength of 1650 nm and a wavelength of 1383 nm.

The conditions in Example 1 are shown in the above described examples of Table 1.

In Example 2, an annealing process can be further conducted to the drawn and extended optical fiber of the above-described example. Hereby potassium (K) with which the core area is doped is dispersed. It was confirmed that, in the optical fiber, a transmission loss at the wavelength of 1550 nm was 0.167 dB/km (example 2-1) in a case of not conducting the annealing process, and in contrast, the transmission loss decreased to 0.165 dB/km (example 2-2) in a case of conducting the annealing process.

As shown in Table 1, in the Example 3, a ratio ($d_1/d_2$) of the outer diameter $d_2$ of the outer glass layer 12a with respect to the outer diameter $d_1$ of the inner glass portion 11a was 1/2. The outside vapor deposition step was conducted to the glass body 10a to produce the glass preform 10. After that, draw and extension were conducted to the produced glass preform 10 to produce an optical fiber of which core diameter is 10.2 µm.

In Example 4, heating power was increased by increasing flow amounts of $H_2$ gas and $O_2$ gas flown from the burner 2 of the VAD device shown in FIG. 1 in comparison to the conditions of Example 2. On the other hand, heating power was decreased by decreasing flow amounts of $H_2$ gas and $O_2$ gas flown from the burner 4 in comparison to the condition of example 2. Other conditions of Example 4 are similar to those of Example 2. Hereby the soot density of the inner deposition soot 1a was increased entirely and uniformly.

Figure 6:
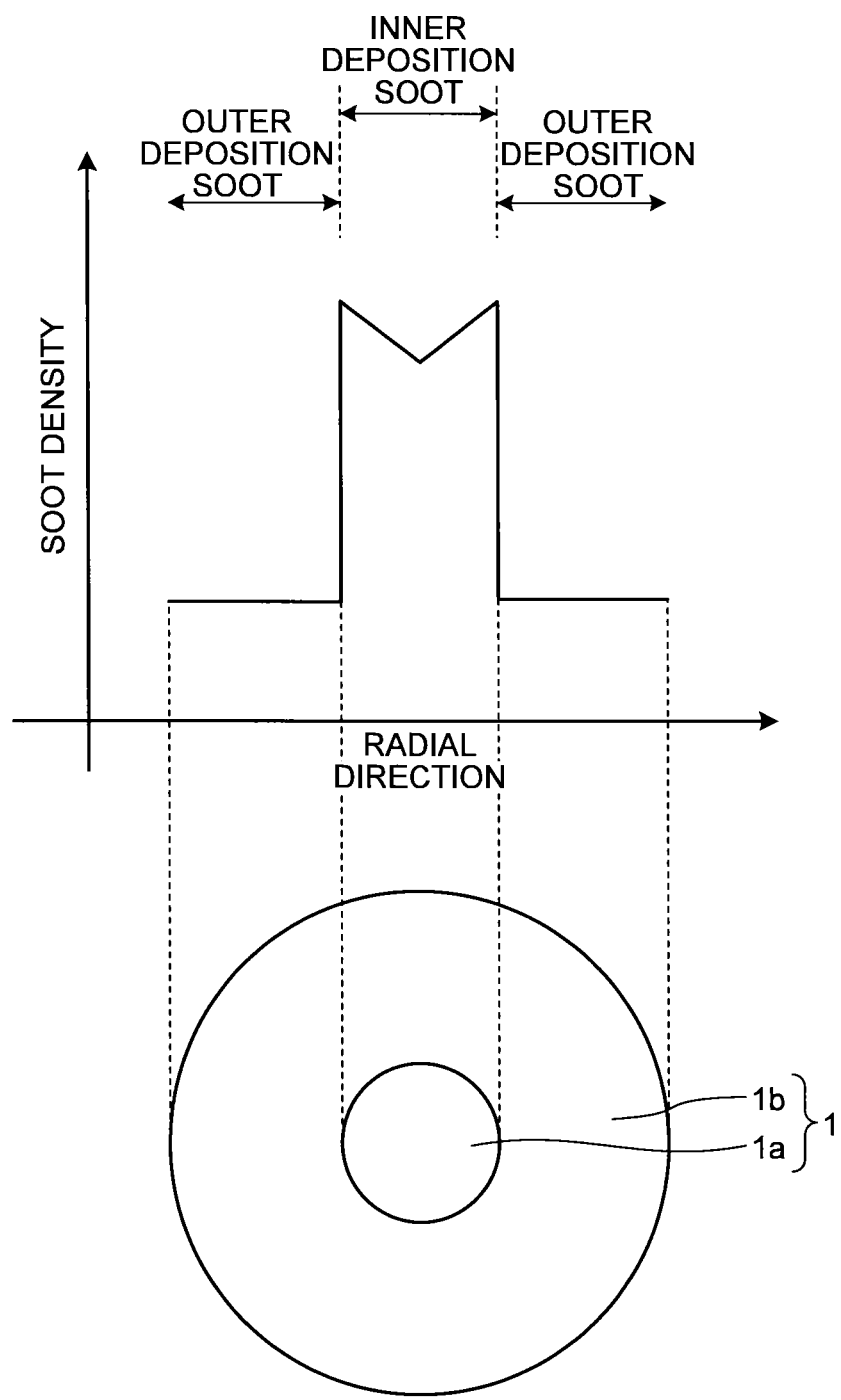
FIG. 6 is a graph showing another example of a soot density along a radial direction of a porous glass soot produced by the production method according to the first embodiment of the present invention.

FIG. 6 shows soot density distribution along a radial direction of the porous glass soot 1 produced as described above. Herein the highest soot density and an average soot density of the inner deposition soot 1a, and a soot density of the outer deposition soot 1b are shown in Table 1, and a density is 0.7 g/cm³ in a region where the soot density is the lowest.

Subsequently, a sintering-and-vitrifying step was conducted, in which the flow amount of fluorine was increased relative to the conditions of Example 1, to produce the glass body 10a. Herein it was confirmed that the refractive index distribution of the glass body 10a was of the refractive index distribution shown in FIG. 4.

Subsequently, an optical fiber of which core diameter is 10.8 µm was produced by conducting the outside vapor deposition step to the glass body 10a to produce the glass preform 10 and conducting draw and extension to the produced glass preform 10. Other conditions of Example 4 are similar to those shown in Table 1.

In Example 5, an average soot density of the inner deposition soot 1a was increased by increasing the heating power of the burners 2 and 4 more than the conditions of Example 4. Conditions following the average soot density were equivalent to those of Example 4. Herein it was confirmed that the refractive index distribution of the glass body 10a was of the refractive index distribution shown in FIG. 4. Other conditions of Example 5 are similar to those shown in Table 1.

In Example 6, the doping amount of K was changed within a range of 10 to 10000 wtppm to produce the glass preforms 10, and then, an optical fiber was produced from each of the glass preforms 10. Examples 6-1, 6-2, 6-3, 6-4, 6-5, and 6-6 indicate the optical fibers produced in this manner, and Table 1 shows results of them. In any one of glass bodies 10a, a ratio ($d_1/d_2$) of outer diameter $d_1$ of the inner glass portion 11a with respect to the outer diameter $d_2$ of the outer glass layer 12a is 1/3.

Table 1 shows that, in Examples 6-1 to 6-11, relative refractive index differences of the outer glass layer 12a and the inner glass portion 11a of respective glass bodies 10a with respect to the pure silica glass and any loss characteristics of optical characteristics of the produced glass preforms 10 satisfy desirable ranges.

In Example 7, the inner deposition soot 1a is produced similarly to Example 1 except that $SiCl_4$ gas, Ar gas, $H_2$ gas, $O_2$ gas, and aluminum chloride (AlCl3) are flown in the burner 2 to dope aluminum (Al) with them. It should be noted that Ge and P other than Al may be doped. Hereby the refractive index can be adjusted with respect to the outer glass layer 12a which will be produced later.

Herein Table 1 shows the maximum soot density of a border portion between the inner deposition soot 1a and the outer deposition soot 1b, an average soot density of the outer deposition soot 1b, and an average soot density of the inner deposition soot 1a including the border portion between the inner deposition soot 1a and the outer deposition soot 1b at which the maximum soot density is obtained. The concentration of Al with which the inner deposition soot 1a is doped was 0.2 wtppm.

Next, the glass body 10a is produced by conducting the vitrification process to the porous glass soot 1. It was confirmed that the refractive index distribution of the glass body 10a becomes the refractive index distribution shown in FIG. 4. Then, after conducting an outside vapor deposition step to the produced glass body 10a and drawing and extending the glass preform 10, an optical fiber of which core diameter is 9.2 µm is produced. Table 1 shows other various conditions in Example 7.

Example 8 is similar to Example 1 except that a flow amount of a mist of potassium nitrate ($KNO_3$) aqueous solution is decreased relative to the condition in Example 1 when producing the porous glass soot 1 by subjecting the porous glass soot 1 to spray disposition.

Then, after the glass preform 10 is produced by conducting the outside vapor deposition step to the glass body 10a, an optical fiber of which core diameter is 10.8 µm is produced by drawing and extending the glass preform 10 at, for example, a speed of 1200 m/min. Table 1 shows other various conditions in Example 8.

Conditions in Example 9 are similar to those of Example 1 except that a ratio of deposition amounts of the inner deposition soot 1a and the outer deposition soot 1b are set to be different from ratios in Example 1. Then, after the glass preform 10 is produced by conducting the outside vapor deposition step to the produced glass body 10a, an optical fiber of which core diameter is 10.8 µm is produced by drawing and extending the glass preform 10. Table 1 shows other various conditions in Example 9.

Figure 7:
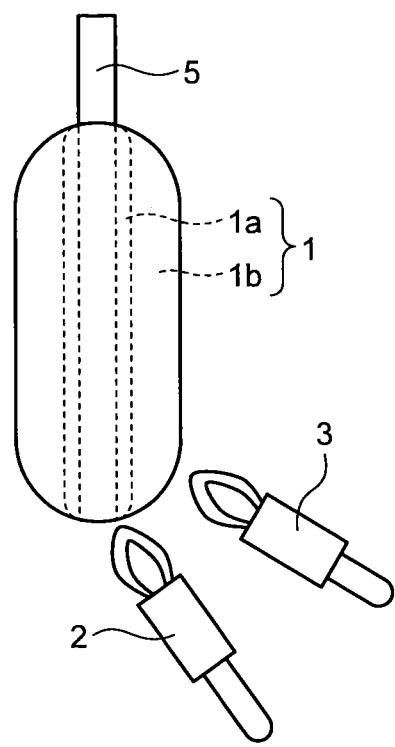
FIG. 7 is a schematic diagram showing an essential part of a VAD device according to a second embodiment of the present invention.

Next, a VAD device used in a second embodiment of the present invention will be explained. FIG. 7 is a schematic diagram showing essential parts of the VAD device used in the second embodiment. Unlike the first embodiment, the second embodiment shown in FIG. 7 is provided with no burner 4 for contracting and firing the border portion between the inner deposition soot 1a and the outer deposition soot 1b (in Table 1, firing burner: unused). Explanation of other configuration will be omitted since they are similar to those of the first embodiment.

Next, Example 10 using the VAD device according to the second embodiment will be explained. In Example 10, the porous glass soot 1 was deposited while increasing fire by increasing amounts of $H_2$ gas and $O_2$ gas emit from the burner 3 with respect to the condition in Example 1. Hereby the outer deposition soot 1b can be deposited outside the formed inner deposition soot 1a and the border portion between the inner deposition soot 1a and the outer deposition soot 1b can be fired. A soot density along a radial direction of the produced porous glass soot 1 is distributed as shown in FIG. 3 similarly to the first embodiment. That is, in Example 10, the soot density at the border portion between the inner deposition soot 1a and the outer deposition soot 1b is increased as shown in Table 1 by increasing the amounts of the $H_2$ gas and the $O_2$ gas emit from the burner 3, and the maximum soot density is equal to or more than 0.7 g/cm³, preferably 1.0 g/cm³. Table 1 shows other various conditions in Example 10.

After that, the glass body 10a is produced by conducting the vitrification process to the porous glass soot 1 in the vitrification furnace. It was confirmed that the refractive index distribution of the glass body 10a produced in this manner becomes the refractive index distribution shown in FIG. 4.

Subsequently, after the glass preform 10 is produced by conducting the outside vapor deposition step to the vitrified glass body 10a, the glass preform 10 is drawn and extended to produce an optical fiber of which core diameter is 11.2 μm.

Moreover, an annealing process can be conducted to the drawn and extended optical fiber. Hereby potassium (K) with which the core area was doped is dispersed. Then, as shown in Table 1, it was confirmed that, in this optical fiber, a transmission loss at a wavelength of 1550 nm was 0.169 dB/km (Example 10-1) in a case of not conducting the annealing process and the transmission loss decreases to 0.167 dB/km (Example 10-2) in a case of conducting the annealing process. Table 1 shows other various conditions in Example 10.

In Example 11, the porous glass soot 1 is produced by using the VAD device shown in FIG. 6. That is, He gas as carrier gas, and $SiCl_4$ gas, Ar gas, $H_2$ gas, and $O_2$ gas as primary material gas, and aerosol of KCl are flown to the burner 2. The aerosol and the mixture gas are injected and deposited to the target rod 5. Hereby the inner deposition soot 1a which is doped with K is produced. $SiCl_4$ gas, Ar gas, $H_2$ gas, and $O_2$ gas are flown to the burner 3. Hereby the outer deposition soot 1b is formed outside the inner deposition soot 1a.

The soot density of the porous glass soot 1 produced in this manner is almost uniform along the radial direction of the porous glass soot 1. Then, after the dehydration step is conducted to such porous glass soot 1 in the vitrification furnace in an ambient temperature of, for example, 1000° C., a preliminary sintering-and-vitrifying step is conducted in an atmosphere at a higher ambient temperature of, for example, 1150° C. Hereby, the inner deposition soot 1a which is doped with K as an alkali metal is contracted selectively to increase an entire soot density of the inner deposition soot 1a from, for example, 0.18 $g/cm^3$ to 0.73 $g/cm^3$ (in Table 1, described as 0.18→0.73 or the like). Accordingly, the maximum soot density of the inner deposition soot 1a also increases. On the other hand, the outer deposition soot 1b is not contracted to maintain the soot density at 0.18 $g/cm^3$.

Herein, when synthesizing by using the VAD method, soot densities are configured not to differ between the inner deposition soot 1a and the outer deposition soot 1b, and only the inner deposition soot 1a is doped with the alkali metal. In the inner deposition soot 1a which is doped with the alkali metal, densification progresses at a relatively low temperature. A range of temperature which is preferable for the preliminary sintering-and-vitrifying step in which the densification progresses is selected as follows. That is, if the temperature for the preliminary sintering and vitrifying of the outer deposition soot 1b is less than 1100° C., a contraction amount of the inner deposition soot 1a decreases, and thus fluorine cannot be prevented from invading the inner deposition soot 1a. On the other hand, if the temperature for the preliminary sintering and vitrifying is higher than 1250° C., sintering of the inner deposition soot 1a progresses, and thus it is not preferable since the outer deposition soot 1b tends to collapse easily. Therefore, it is preferable that, in the preliminary sintering-and-vitrifying step in Example 11, the ambient temperature be equal to or higher than 1100° C. and equal to or less than 1250° C. Hereby only the soot density of the inner deposition soot 1a can be increased without increasing the soot density of the outer deposition soot 1b.

It is not preferable that, if the average soot density in the inner deposition soot 1a is less than 0.7 $g/cm^3$, the amount of doped fluorine increases, and thus the relative refractive index difference between the inner glass portion 11a and the outer glass layer 12a is not equal to or more than the necessary relative refractive index difference. It is not preferable that, if the average soot density of the inner deposition soot 1a exceeds 1.7 $g/cm^3$, a closed pore is produced in the inner deposition soot 1a. Therefore, it is preferable that the average soot density of the inner deposition soot 1a be equal to or more than 0.7 $g/cm^3$ and equal to or less than 1.7 $g/cm^3$.

After that, the porous glass soot 1 is sintered and vitrified at a temperature of, for example, 1350° C. in a mixture gas atmosphere of $SiF_4$ gas and He gas while being doped with fluorine. In this case, since the entire soot density of the inner deposition soot 1a is more than the soot density of the outer deposition soot 1b, fluorine can be prevented from invading the inner deposition soot 1a when doping with fluorine in the sintering-and-vitrifying step. Hereby the inner deposition soot 1a is doped with very little fluorine. Herein "C" described in Table 1 indicates a method of doping with fluorine by increasing the entire soot density of the inner deposition soot 1a more than the soot density of the outer deposition soot 1b in the vitrification process.

It was confirmed that the refractive index distribution of the glass body 10a produced in this manner becomes the refractive index distribution shown in FIG. 4. Next, the glass preform 10 is produced by conducting the outside vapor deposition step to the glass body 10a produced in this manner. Then, an optical fiber of which core diameter is 10.2 μm is produced by drawing and extending the glass preform 10. Table 1 shows other various conditions in Example 11.

In Example 12, the porous glass soot 1 is produced by using the VAD device shown in FIG. 6. In Example 12, the concentration of K (KCl) to be doped is increased as shown in Table 1 with respect to the conditions of Example 11. The soot density of the porous glass soot 1 produced in this manner is almost uniform along the radial direction of the porous glass soot 1, and the soot densities of the inner deposition soot 1a and the outer deposition soot 1b are 0.18 $g/cm^3$.

Then, after the dehydration step is conducted to such porous glass soot 1 in the vitrification furnace in at an ambient temperature of, for example, 1000° C., the porous glass soot 1 is exposed to a higher ambient temperature of, for example, 1110° C. Hereby the inner deposition soot 1a which is doped with K is contracted selectively to increase the soot density from 0.18 $g/cm^3$ to 0.82 $g/cm^3$. On the other hand, the outer deposition soot 1b is not contracted to maintain the soot density at 0.18 $g/cm^3$.

Then the porous glass soot 1 is vitrified at a temperature of, for example, 1350° C. at an atmosphere of mixture gas of $SiF_4$ gas and He gas while being doped with fluorine. It was confirmed that the refractive index distribution of the glass body 10a produced in this manner becomes the refractive index distribution shown in FIG. 4.

Next, the glass preform 10 is produced by conducting the outside vapor deposition step to the glass body 10a produced in this manner. Then an optical fiber of which core diameter is 9.7 μm is produced by drawing and extending the glass preform 10. Table 1 shows other various conditions of Example 12.

In Example 13, the porous glass soot 1 is produced by using the VAD device shown in FIG. 6. In Example 13, the concentration of K (KCl) to be doped is decreased as shown in Table 1 in comparison to the conditions of Example 11. The soot density of the porous glass soot 1 produced in this manner is almost uniform along the radial direction of the porous glass soot 1.

Then, after the dehydration step is conducted to the porous glass soot 1 in the vitrification furnace in an ambient temperature of, for example, 1000° C., the porous glass soot 1 is exposed to a higher ambient temperature of, for example, 1230° C. Hereby the inner deposition soot 1a which is doped with K is contracted selectively to increase the soot density. On the other hand, the soot density of the outer deposition soot 1b is maintained.

After that, the porous glass soot 1 is sintered and vitrified at a temperature of, for example, 1350° C. in a mixture gas atmosphere of $SiF_4$ gas and He gas while being doped with fluorine. It was confirmed that the refractive index distribution of the glass body 10a produced in this manner becomes the refractive index distribution shown in FIG. 4.

Next, the glass preform 10 is produced by conducting the outside vapor deposition step to the glass body 10a produced in this manner. Then an optical fiber of which core diameter is 9.6 μm is produced by drawing and extending the glass preform 10. Table 1 shows other various conditions in Example 13.

Hereafter comparison examples will be explained for confirming effects of Examples 1 to 9 based on the above-described first embodiment and Examples 10 to 13 based on the second embodiment.

Comparison Example 1 will be explained at first. Comparison Example 1 uses a VAD device configured in which only the burner 2 is provided and the burners 3 and 4 are not provided in the VAD device shown in FIG. 1. $SiCl_4$ gas as primary material gas, Ar gas, $H_2$ gas, and $O_2$ gas, and misty liquid (in mist state) made by ultrasonic wave from KCl aqueous solution are flown from the burner 2 with Ar gas as carrier gas. Hereby a porous glass soot is produced in which soot density makes no difference along the radial direction of the porous glass soot. The glass body is produced by exposing the porous glass soot to an aerosol atmosphere including solid particle state of KCl in the vitrification furnace while the porous glass soot is doped with K. Since the soot density makes no difference along the radial direction of the porous glass soot in this case, the glass body is produced which is doped with potassium entirely. A concentration of potassium with which the glass body is doped is 300 wtppm, and its refractive index was similar to that of a pure silica glass.

Then, after further depositing a porous glass soot on the glass body 10a, the glass preform is produced by conducting vitrification to the glass body 10a while doping with fluorine. In a region in which the glass preform is doped with fluorine, a relative refractive index difference with respect to a pure silica glass was −0.31%. Moreover, in order to obtain more uniform refractive index, the outside vapor deposition step is conducted to form a glass while doping with fluorine. Hereby, a glass preform was produced in which a ratio of an outer diameter of a region doped with K and an outer diameter of a region doped with fluorine (F) is 10.2:125. In Table 1, "D" indicates a fluorine-doping method by which a layer doped with fluorine is formed. After that, an optical fiber was produced by drawing and extending the glass preform similarly to Example 1. In the optical fiber produced in this manner, a transmission loss at a wavelength of 1383 nm was extremely large, i.e., equal to or more than 3 dB/km. Other various conditions of Comparison Example 1 are shown in Table 1.

In Comparison Example 2, an average soot density of an outer deposition soot was increased to 0.62 g/cm³ by increasing a heating power of the burner 3 for forming the outer deposition soot by using the VAD device shown in FIG. 1.

Next, a glass body is produced by conducting, similarly to Example 2, a sintering-and-vitrifying step to the porous glass soot produced in this manner. In this case, as shown in Table 1, a relative refractive index difference of an inner glass portion with respect to a pure silica glass was −0.05%, and a relative refractive index difference of an outer glass layer with respect to a pure silica glass was −0.15%. That is, when producing the optical fiber, a desirable relative refractive index difference could not be obtained between the inner glass portion and the outer glass layer. Other various conditions of Comparison Example 2 are shown in Table 1.

Next, a third embodiment of the present invention will be explained. Essential parts of the VAD device are similar to those of the first embodiment, thus FIG. 8 shows a vitrification furnace and an aerosol generator according to the third embodiment.

Figure 8:
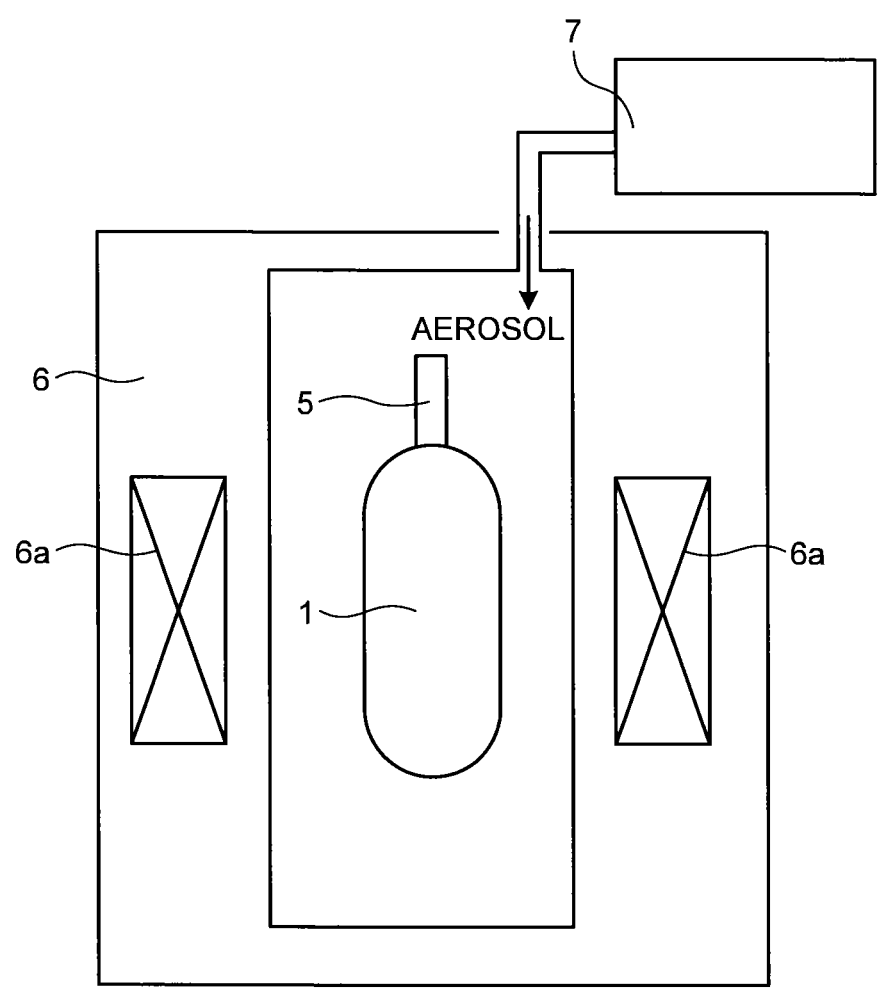

As shown in FIG. 8, a vitrification furnace 6 according to the third embodiment is provided with a heater 6a and is connected to an aerosol generator 7 configured to be capable of producing aerosol. The vitrification furnace 6 conducts the dehydration process to the porous glass soot 1 at a predetermined temperature of, for example, approximately 1100° C. After conducting the dehydration process, an alkali metal element such as K or the like is infiltrated to the entire porous glass soot 1 while supplying aerosol of a compound of alkali metal such as, for example, KCl or the like and chlorine from the aerosol generator 7. For carrier gas, inert gas such as He or Ar can be used.

After that, the porous glass soot 1 is, while being doped with fluorine, subjected to vitrification by exposing the porous glass soot 1 to an atmosphere of mixture gas of, for example, fluorine compound gas such as $SiF_4$ or the like and inert gas such as He or the like at a temperature as high as, for example, approximately 1350° C., which is higher than the predetermined temperature at the dehydration process.

Figure 9:
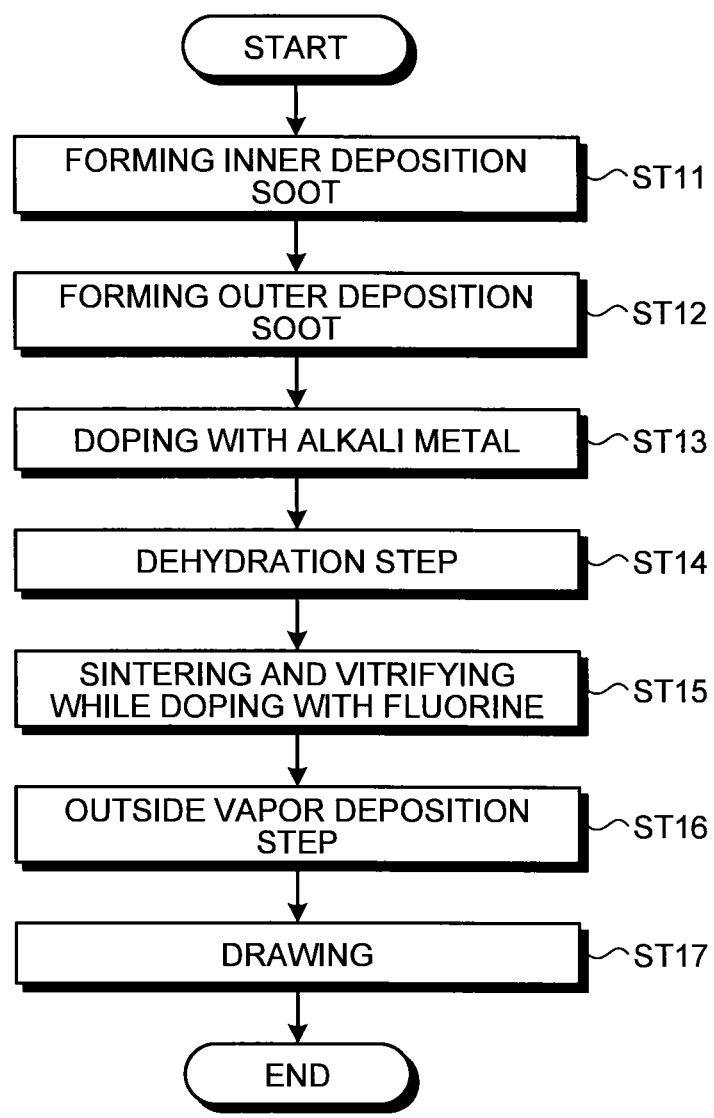
FIG. 9 is a flowchart showing a production method according to the third embodiment of the present invention.

Hereafter, methods of, and in a succession of, producing the porous glass soot using the VAD device configured as described above, producing the glass body by using the vitrification furnace, producing the glass preform from the glass body, and producing the optical fiber from the glass preform will be explained. FIG. 9 is a flowchart of a production method according to the third embodiment.

That is, an inner deposition soot 1a is formed by using the VAD device shown in FIG. 1 similarly to the first embodiment (step ST11 in FIG. 9). The inner deposition soot 1a may be doped with Al, Ge, or P or the like. Hereby it is possible to attempt adjustment of a refractive index of an inner glass portion 11a formed from the inner deposition soot 1a later and a refractive index of the outer glass layer 12a formed later from the outer deposition soot 1b synthesized outside thereof. After that, the outer deposition soot 1b is deposited outside the inner deposition soot 1a by spraying each gas from the burner 3 to cause silica glass particles to be deposited outside the inner deposition soot 1a (step ST12 in FIG. 9).

Moreover, in parallel with the above-described steps ST11 and ST12, at least an outer periphery portion of the inner deposition soot 1a is contracted by flame injected from the burner 4 disposed between the burner 2 and the burner 3. Although only $H_2$ gas and $O_2$ gas are flown in the burner 4 in the third embodiment, misty aqueous solution of $SiCl_4$ and $KNO_3$ or the like made by ultrasonic wave may be flown simultaneously.

The porous glass soot 1 is produced by depositing the outer deposition soot 1b outside the inner deposition soot 1a in the above-described steps ST11 and ST12. Since an outer periphery portion of the inner deposition soot 1a is contracted in the production of the porous glass soot 1 by synthesizing the inner deposition soot 1a and the outer deposition soot 1b together, at least an interface with the outer deposition soot 1b (border portion) is fired and contracted. Heating power can be adjusted by adjusting the amount of $H_2$ gas and $O_2$ gas flown from the burner 2 of the VAD device, or by adjusting the amount of $H_2$ gas and $O_2$ gas flown from the burner 4. Hereby not only the border portion of the inner deposition soot 1a with the outer deposition soot 1b but also the entire inner deposition soot 1a can be fired to increase the soot density of the inner deposition soot 1a entirely and uniformly.

After that, the entire porous glass soot 1 produced in the above manner is doped with alkali metal element (step ST13). Since the alkali metal tends to be dispersed easily, the alkali metal is dispersed in the entire porous glass soot 1 regardless of the soot density of the porous glass soot 1. Therefore, both the inner deposition soot 1a and the outer deposition soot 1b can be doped with the alkali metal. If necessary, the doping with the alkali metal element can be conducted after the dehydration step or the sintering-and-vitrifying step which will be explained later. Herein the alkali metal may be, for example, K, Li, Na, Rb, or Cs. Since a fictive temperature when drawing and extending an optical fiber being produced as explained later can be decreased by doping the porous glass soot 1 with the alkali metal and since distortion along a radial direction of an optical fiber can be moderated, a transmission loss of the optical fiber can be reduced.

After being formed, the porous glass soot 1 may be doped with Cl in, for example, a vitrification furnace or the like. If the porous glass soot 1, after being formed, is doped with Cl, viscosity in a doped region can be reduced. Hereby the distortion in the optical fiber finally produced can be reduced, thus it is possible to reduce transmission loss.

When being doped with alkali metal, various methods can be adapted. That is, various methods can be adapted according to any one of the states, in solid phase (solid particle), liquid phase such as aqueous solution (liquid), and vapor phase (gas, ion) of the alkali metal compounds such as, for example, KCl or the like.

In a step ST13 as described in the third embodiment, it is preferable that, when the porous glass soot 1 is doped with alkali metal when synthesizing the porous glass soot 1 by the VAD device, a state of the alkali metal compound be aerosol as solid phase or mist as liquid phase. If the alkali metal is in an aerosol state in a reduced diameter, the alkali metal tends to adhere a surface of the porous glass soot 1 and can be dispersed in the porous glass soot 1, thus the entire glass body, which will be formed later, can be doped with the alkali metal.

In a case where the porous glass soot 1 is doped with the alkali metal prior to a later sintering-and-vitrifying step, it is preferable that the alkali metal compound be in an aerosol state as a solid phase or an ion state as a vapor phase. The entire porous glass soot 1 can be doped with the alkali metal element by exposing the porous glass soot 1 to an atmosphere of alkali metal ion at a high temperature.

It is not preferable that, if a concentration of the alkali metal with which the porous glass soot 1 is doped is less than 10 wtppm at a time of becoming the glass preform 10 later, an effect, by the alkali metal, of decreasing the fictive temperature is reduced in a drawing step when producing the optical fiber, and since transmission loss increases because of an affection of distortion in a highly tensile drawing condition. On the other hand, if a concentration of the alkali metal of the inner glass is higher than 10000 wtppm at a time of becoming the glass preform 10 later, a region which becomes a core portion of the optical fiber tends to be crystallized when further producing the optical fiber as a final product. Therefore, it is not preferable since the region becoming the core portion of the optical fiber may be possibly cracked in the sintering-and-vitrifying step which will be explained later. Therefore, it is preferable that a concentration of the alkali metal with which the porous glass soot 1 is doped be equal to or more than 10 wtppm and equal to or less than 10000 wtppm. Moreover, if a concentration of the alkali metal exceeds 5000 wtppm at a time of becoming the glass preform 10, Rayleigh scattering increases because of affection of alkali element in a produced optical fiber. Therefore, it is more preferable that a concentration of the alkali metal with which the inner deposition soot 1a is doped be equal to or more than 10 wtppm and equal to or less than 5000 wtppm. Explanation will be omitted for soot density distribution, which is similar to that of the first embodiment, of the porous glass soot 1.

Next, similarly to the first embodiment, as shown in FIG. 9, a dehydration step was conducted to the porous glass soot 1 in the vitrification furnace 6 at a predetermined temperature (step ST14). After that, a sintering and vitrifying is conducted while doping with fluorine at a temperature higher than the predetermined temperature in the dehydration step in an atmosphere of mixture gas of fluorine compound as, for example, $SiF_4$ gas and He gas as, for example, carrier gas (step ST15). Hereby the glass body 10a is produced. As described above, doping with the alkali metal element can be conducted after the step ST15, i.e., after producing the glass body 10a. In this case, it is preferable that the alkali metal compound be in an ion state as vapor phase. As described above, since the entire glass body 10a can be doped with the alkali metal element by exposing the glass body 10a at a high ambient temperature of the alkali metal ion, an effect, by doping with the alkali metal, similar to the effect described above, can be obtained. Explanations will be omitted for the step ST16 and the step ST17 respectively because they are similar to the step ST6 and the step ST7 of the first embodiment. Explanations will be omitted for other configurations of the produced glass body 10a and the glass preform 10 because they are similar to those of the first embodiment.

The third embodiment can obtain an effect similar to that of the first embodiment.

Hereafter, an example will be explained based on the above-described third embodiment. Table 2 shows a state of potassium, a method of doping with fluorine, a soot density, outer-inner-diameter ratio $d_1/d_2$, potassium concentration, relative refractive index difference with respect to pure silica glass, core diameter, transmission loss, and as to whether or not using the firing burner, respectively in Examples.

TABLE 2

|  | State of potassium | Method of doping with fluorine | Soot density [g/cm³] | | | Outer-diameter-inner-diameter ratio Outer $d_1/d_2$ |
|---|---|---|---|---|---|---|
|  |  |  | Interface | Inner average | Inner maximum |  |
| Example 14 | KCl in aerosol state | A | 1.1 | 0.205 | 1.1 | 0.18 1/3 |

TABLE 2-continued

| | | | | | | | | |
|---|---|---|---|---|---|---|---|---|
| Example 15 | KCl in aerosol state | A | 1.1 | 0.205 | 1.1 | 0.18 | 1/2 | |
| Example 16-1 | KCl in aerosol state | A | 1.05 | 0.21 | 1.05 | 0.18 | 1/2 | |
| Example 16-2 | KCl in aerosol state | A | 1.05 | 0.21 | 1.05 | 0.18 | 1/2 | |
| Example 17 | KCl in aerosol state | B | 0.85 | 0.8 | 0.9 | 0.35 | 1/2.7 | |
| Example 18 | KCl in aerosol state | B | 1.15 | 1.1 | 1.2 | 0.35 | 1/2.7 | |
| Example 19-1 | KCl in aerosol state | A | 1.1 | 0.205 | 1.1 | 0.18 | 1/3 | |
| Example 19-2 | KCl in aerosol state | A | 1.1 | 0.205 | 1.1 | 0.18 | 1/3 | |
| Example 19-3 | KCl in aerosol state | A | 1.1 | 0.205 | 1.1 | 0.18 | 1/3 | |
| Example 19-4 | KCl in aerosol state | A | 1.1 | 0.205 | 1.1 | 0.18 | 1/3 | |
| Example 19-5 | KCl in aerosol state | A | 1.1 | 0.205 | 1.1 | 0.18 | 1/3 | |
| Example 19-6 | KCl in aerosol state | A | 1.1 | 0.205 | 1.1 | 0.18 | 1/3 | |
| Example 19-7 | KCl in aerosol state | A | 1.1 | 0.205 | 1.1 | 0.18 | 1/3 | |
| Example 19-8 | KCl in aerosol state | A | 1.1 | 0.205 | 1.1 | 0.18 | 1/3 | |
| Example 19-9 | KCl in aerosol state | A | 1.1 | 0.205 | 1.1 | 0.18 | 1/3 | |
| Example 20 | KCl in aerosol state | A | 1.1 | 0.205 | 1.1 | 0.18 | 1/1.9 | |
| Example 21 | KCl in aerosol state | A | 1.1 | 0.205 | 1.1 | 0.18 | 1/1.9 | |
| Example 22-1 | KCl in aerosol state | A | 1.05 | 0.33 | 1.05 | 0.35 | 1/4.5 | |
| Example 22-2 | KCl in aerosol state | A | 1.05 | 0.33 | 1.05 | 0.35 | 1/4.5 | |
| Comparison example 3 | KCl in aerosol state | D | — | — | — | — | — | |
| Comparison example 4 | KCl in aerosol state | A | 1.1 | 0.65 | 1.1 | 0.62 | 1/3 | |

| | Potassium concentration [wtppm] | Relative refractive index difference with respect to silica glass [%] | | Core diameter [μm] | Transmission loss [dB/km] | | Firing burner |
|---|---|---|---|---|---|---|---|
| | | Inner glass portion | Outer glass portion | | Wavelength 1383 mm | Wavelength 1550 mm | |
| Example 14 | 350 | −0.05 | −0.36 | 10.2 | 0.34 | 0.163 | Used |
| Example 15 | 350 | −0.05 | −0.36 | 10.2 | 0.39 | 0.165 | Used |
| Example 16-1 | 400 | −0.06 | −0.36 | 10.3 | 0.33 | 0.167 | Used |
| Example 16-2 | 400 | −0.06 | −0.36 | 10.3 | 0.33 | 0.165 | Used |
| Example 17 | 1100 | −0.09 | −0.39 | 10.3 | 0.357 | 0.163 | Used |
| Example 18 | 1200 | −0.09 | −0.39 | 10.3 | 0.357 | 0.163 | Used |
| Example 19-1 | 200 | −0.02 | −0.38 | 9.5 | 0.34 | 0.164 | Used |
| Example 19-2 | 600 | −0.11 | −0.41 | 10.3 | 0.34 | 0.164 | Used |
| Example 19-3 | 10 | −0.07 | −0.39 | 10 | 0.32 | 0.18 | Used |
| Example 19-4 | 40 | −0.02 | −0.27 | 11.4 | 0.33 | 0.167 | Used |
| Example 19-5 | 10000 | −0.04 | −0.41 | 9.3 | 0.41 | 0.18 | Used |
| Example 19-6 | 6500 | −0.05 | −0.43 | 9.2 | 0.37 | 0.177 | Used |
| Example 19-7 | 5000 | 0 | −0.5 | 8.1 | 0.36 | 0.175 | Used |
| Example 19-8 | 140 | −0.1 | −0.39 | 10.7 | 0.35 | 0.165 | Used |

TABLE 2-continued

| Example | | | | | | | |
|---|---|---|---|---|---|---|---|
| Example 19-9 | 1800 | 0 | −0.42 | 8.7 | 0.35 | 0.17 | Used |
| Example 20 | 7 | −0.05 | −0.36 | 10.3 | 0.34 | 0.181 | Used |
| Example 21 | 350 | −0.05 | −0.36 | 10.8 | 0.42 | 0.171 | Used |
| Example 22-1 | 800 | −0.09 | −0.34 | 11.2 | 0.36 | 0.169 | Unused |
| Example 22-2 | 800 | −0.09 | −0.34 | 11.2 | 0.36 | 0.167 | Unused |
| Comparison example 3 | 300 | 0 | −0.31 | 10.2 | Equal to or more than 3 | 0.168 | — |
| Comparison example 4 | 350 | −0.05 | −0.15 | — | — | — | — |

In Examples, the inner deposition soot 1a and the outer deposition soot 1b are formed in this order by flowing primary material gas, for example, $SiCl_4$ gas, $H_2$ gas, $O_2$ gas, and Ar gas, in the burners 2 and 3 in the VAD device shown in FIG. 1 respectively.

In these examples, densities were set variously so that the soot density at the border portion of the inner deposition soot 1a and the outer deposition soot 1b of the porous glass soot 1 (interface in Table 2) is within a range of equal to or more than 0.85 g/cm³ and equal to or less than 1.15 g/cm³ as shown in FIG. 3 and Table 2. In this case, the average soot density of the inner deposition soot 1a including the border portion (inner average in Table 2) varied within a range of equal to or more than 0.205 g/cm³ and equal to or less than 1.1 g/cm³. The average soot density of the outer deposition soot 1b (outer in Table 2) varied within a range of equal to or more than 0.18 g/cm³ and equal to or less than 0.35 g/cm³.

The dehydration step is conducted to the porous glass soot 1 in the vitrification furnace 6 shown in FIG. 8 at, for example, a temperature of 1100° C. Potassium is infiltrated to the entire porous glass soot 1 by making inside the vitrification furnace 6 aerosol atmosphere by supplying KCl aerosol into the vitrification furnace 6 from the aerosol generator 7. For example, He gas is used as carrier gas for KCl aerosol.

Subsequently, the sintering-and-vitrifying step is conducted, while doping with fluorine in an atmosphere of mixed-gas of $SiF_4$ gas and He gas at a temperature of, which is higher than that of the processing temperature in the dehydration step, for example, 1350° C.

It was confirmed that, in most of Examples of the glass bodies 10a produced in this manner, average relative refractive index difference of the inner glass portion 11a with respect to a pure silica glass was equal to or more than −0.11% and equal to or less than 0%. That is, it was confirmed that the inner glass portion 11a was doped with a reduced amount of fluorine. On the other hand, it was confirmed that an average relative refractive index difference of the glass body 10a of the outer glass layer 12a with respect to a pure silica glass was equal to or more than −0.5% and equal to or less than −0.27%. As described above, it was confirmed that, in these examples, refractive index distribution shown in FIG. 4 was obtained. Moreover, a ratio ($d_1/d_2$) of an outer diameter $d_1$ of the inner glass portion 11a and an outer diameter $d_2$ of the outer glass layer 12a was 1/1.9 to 1/4.5. Moreover, an analysis of element with which the glass body 10a was doped indicated that K was detected in the entire glass body 10a uniformly with a doping concentration of 350 wtppm.

After that, the outer glass layer 12b shown in FIG. 5 is formed by conducting a so-called outside vapor deposition step in which sintering and vitrifying is conducted to outside the glass body 10a twice in a mixed atmosphere of $SiF_4$ gas and He gas so that a refractive index thereof is close to a refractive index of the outer glass layer 12a. Hereby the glass preform 10 is produced. A ratio of an outer diameter of the inner glass 11 and an outer diameter of the glass preform 10 is 10.2:125 in the glass preform 10 produced in this manner.

Then an optical fiber of which outer diameter is 125 μm is produced by drawing and extending the glass preform 10 produced in this manner at a speed of, for example, 1200 m/min. The inner glass 11 forms the core portion of the optical fiber, and its core diameter is 8.7 to 11.2 μm. Moreover, it was confirmed that a transmission loss of the produced optical fiber was 0.163 to 0.18 dB/km at a wavelength of 1550 nm, a transmission loss was 0.32 to 0.42 dB/km at a wavelength of 1383 nm, and these transmission losses were within the standard of ITU-TG652D. Moreover, a relative refractive index difference of the core portion of the optical fiber with respect to a pure silica glass was −0.11 to 0%, and a relative refractive index difference of the cladding portion with respect to a pure silica glass was −0.5 to −0.27%.

Table 2 shows state of potassium, method of doping with fluorine, soot density, $d_1/d_2$ of outer-inner-diameter ratio, potassium concentration, relative refractive index difference with reference to pure silica glass, core diameter, transmission loss, and as to whether or not firing burner is used (hereafter various conditions) for Example 14 respectively.

It was confirmed that, when an optical fiber, as an optical transmission medium, in a length of, for example, 50 km was produced by using the optical fiber produced in the above described manner, a transmission loss did not increase at both a wavelength of 1550 nm and a wavelength of 1383 nm.

Unlike Example 14, the porous glass soot 1, of which deposition amount of the outer deposition soot 1b was reduced, is produced in Example 15. Hereby, in Example 15, the glass body 10a is produced of which ratio ($d_1/d_2$) of the outer diameter $d_1$ of the inner glass portion 11a and the outer diameter $d_2$ of the outer glass layer 12a is 1/2. Then, after producing the glass preform 10 by conducting the outside vapor deposition step to the glass body 10a, an optical fiber is produced of which core diameter is 10.2 μm by drawing and extending the produced glass preform 10. Other various conditions of Example 15 are shown in Table 2.

Next, in Example 16, the porous glass soot 1 was of the soot density distribution shown in FIG. 3.

Figure 10:
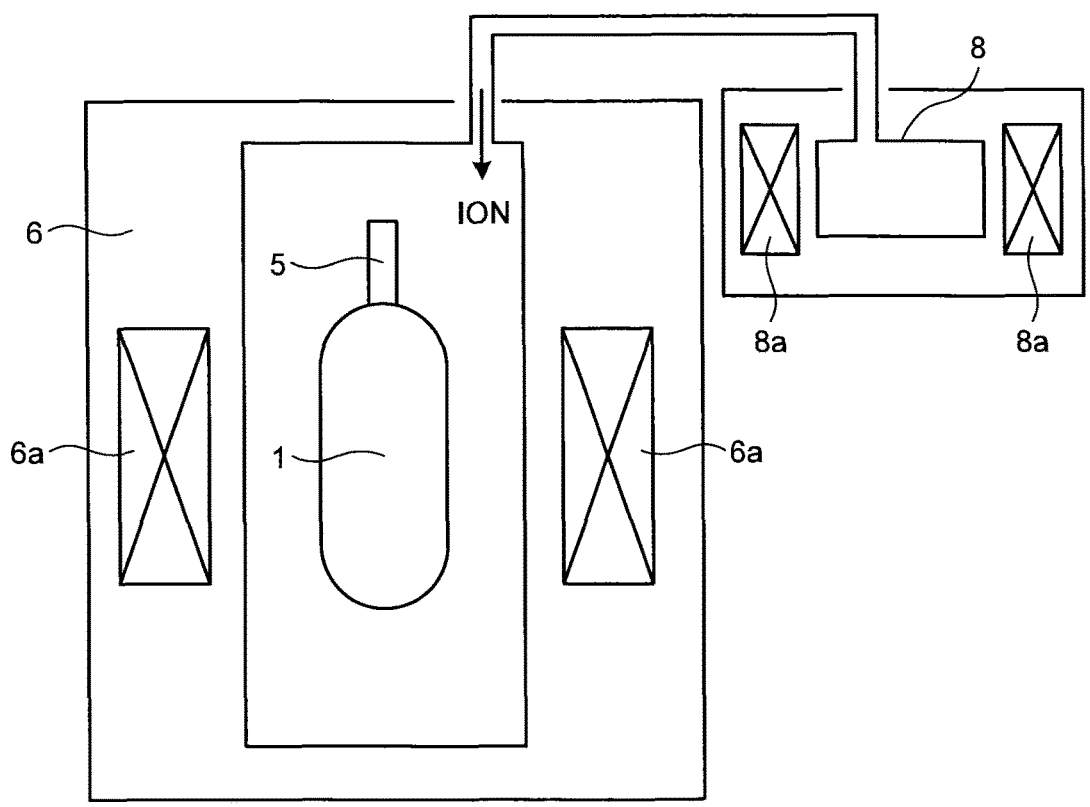
FIG. 10 is a configuration diagram showing an essential part of a vitrification furnace and a vaporization device used in the third embodiment of the present invention.

This Example 16 uses the vitrification furnace 6 connected to a vaporization device 8 shown in FIG. 10. As shown in FIG. 10, the vitrification furnace 6 is provided with a heater 6a and is, in addition, connected to the vaporization device 8 provided with a heater 8a and configured to be capable of vaporization (ionization) of atom and molecule. The vitrification furnace 6 conducts the dehydration step to the porous glass soot 1 at temperature of, for example, 1100° C. After that, KCl is subjected to vaporization, that is, ionization, by the vaporization device 8 to be supplied into the vitrification furnace 6. Hereby, inside the vitrification furnace 6 is made to be potassium ion atmosphere, and K is infiltrated to the entire porous glass soot 1.

Subsequently, a sintering and vitrifying are conducted while doping with fluorine at a temperature higher than the processing temperature at the dehydration step, for example, 1350° C. and in an atmosphere of a mixture gas of $SiF_4$ gas and He gas to produce the glass body 10a. The glass body 10a produced in this manner was of a refractive index distribution shown in FIG. 4. After conducting the outside vapor deposition step to the glass body 10a to produce the glass preform 10, the glass preform 10 was drawn and extended to produce an optical fiber of which core diameter is 10.3 μm.

Moreover, an annealing process was conducted to the drawn and extended optical fiber. Hereby K, with which the core area was doped, was dispersed. Then, it was confirmed that, in the optical fiber, a transmission loss at a wavelength of 1550 nm decreased from 0.167 dB/km (Example 16-1) to 0.165 dB/km (Example 16-2). Other various conditions in Example 16 are shown in Table 2.

In Example 17, amounts of $H_2$ gas and $O_2$ gas flowing from the burner 2 of the VAD device shown in FIG. 1 are increased with respect to the conditions of Example 14 to increase heating power. Other conditions in Example 17 are similar to those of Example 14. Hereby, the soot density of the inner deposition soot 1a increases entirely and uniformly.

A soot density distribution along the radial direction of the porous glass soot 1 produced in this manner was of the density distribution shown in FIG. 6. The soot density is shown in Table 2.

Next, the dehydration step is conducted to the porous glass soot 1 in the vitrification furnace 6 shown in FIG. 8 at a temperature of, for example, 1100° C. After that, Potassium is infiltrated to the entire porous glass soot 1 by making inside the vitrification furnace 6 aerosol atmosphere by supplying KCl aerosol into the vitrification furnace 6 from the aerosol generator 7. For example, He gas is used as carrier gas for KCl aerosol.

After that, the glass body 10a is produced by conducting the sintering-and-vitrifying step in a fluorine atmosphere in which a ratio of $SiF_4$ was increased with respect to the condition of Example 14. It was confirmed that, the refractive index distribution of the glass body 10a was of the refractive index distribution shown in FIG. 4. Subsequently, after the glass preform 10 was produced by conducting the outside vapor deposition step to the glass body 10a, an optical fiber of which core diameter is 10.3 μm was produced by drawing and extending the produced glass preform 10. Other various conditions of Example 17 are shown in Table 2.

In Example 18, an average soot density of the inner deposition soot 1a is increased to 1.1 g/cm³ by increasing the heating power of the burners 2 and 4 with respect to the condition of Example 17. After that, the glass body 10a was produced by subjecting the porous glass soot 1 produced in this manner to vitrification while doping with K under condition similar to that of Example 17. It was confirmed that a refractive index distribution of the glass body 10a was of the refractive index distribution shown in FIG. 4. Other various conditions of Example 18 are shown in Table 2.

In Example 19, the glass preforms 10 are produced by further varying the doping amount of K of alkali metal within a range of 10 to 10000 wtppm with respect to the similar condition of Example 15. After that, optical fibers are produced from the glass preforms 10 respectively. As shown in Table 2, Examples 19-1, 19-2, 19-3, 19-4, 19-5, 19-6, 19-7, 19-8, and 19-9 indicate the optical fibers produced in this manner respectively.

From Table 2, it is understood that, a relative refractive index differences of the respective glass bodies 10a of the outer glass layer 12a with respect to a pure silica glass, relative refractive index difference of the inner glass portion 11a and the outer glass layer 12a, and loss characteristics of optical characteristics of the produced glass preforms 10 of Examples 19-1 to 19-9 satisfy desirable ranges.

In Example 20, the porous glass soot 1 is produced at first. After that, KCl aerosol is supplied from the aerosol generator 7 into the vitrification furnace 6 by using He gas as carrier gas. Hereby inside the vitrification furnace 6 becomes aerosol atmosphere, and potassium is infiltrated in the entire porous glass soot 1. The KCl concentration in this state is decreased to approximately ⅕₀ of that of Example 14. After that, the sintering-and-vitrifying step is conducted to the porous glass soot 1. When the concentration of K contained in the glass body 10a produced in this manner was measured, it was confirmed that the concentration was 7 wtppm in the entire glass body 10a uniformly.

Subsequently, after the glass preform 10 was produced by conducting the outside vapor deposition step to the glass body 10a, an optical fiber of which core diameter is 10.3 μm is produced by drawing and extending the glass preform 10 at a speed of, for example, 1200 m/min. Other various conditions of Example 20 are shown in Table 2.

In Example 21, the porous glass soot 1 is produced under a condition similar to that of Example 14 except that a ratio of the deposition amounts of the inner deposition soot 1a and the outer deposition soot 1b differs from that of Example 14. Then, the glass body 10a is produced by conducting the sintering-and-vitrifying step to the porous glass soot 1. After the glass preform 10 was produced by conducting the outside vapor deposition step to the glass body 10a produced in this manner, an optical fiber of which core diameter is 10.8 μm is produced by drawing and extending the produced glass preform 10. Other various conditions of Example 21 are shown in Table 2.

Hereafter a fourth embodiment will be explained. Unlike the third embodiment, the glass preform 10 is produced in the fourth embodiment similarly to the third embodiment except for using the VAD device not provided with the burner 4 shown in FIG. 7 for firing use.

Hereafter Example 22 using the VAD device shown in FIG. 7 will be explained. In Example 22, while heating power was increased by increasing flow amounts of $H_2$ gas and $O_2$ gas flown from the burner 3 in comparison to the condition of Example 14 to deposit the porous glass soot 1. Hereby, after forming the inner deposition soot 1a, the outer deposition soot 1b can be deposited outside the inner deposition soot 1a and the border portion of the inner deposition soot 1a and the outer deposition soot 1b can be fired. The soot density along the radial direction of the produced porous glass soot 1 is close to the soot density distribution shown in FIG. 3. That is, in Example 22, the soot density in the border portion of the inner deposition soot 1a and the outer deposition soot 1b is increased by increasing amounts of H₂ gas and O₂ gas injected from the burner 3.

Then, after doping the porous glass soot 1 with K inside the vitrification furnace 6 shown in FIG. 8 similarly to Example 14, the sintering-and-vitrifying step is conducted to the porous glass soot 1 to produce the glass body 10a. The glass preform 10 is produced by conducting the outside vapor deposition step to the glass body 10a produced in this manner, and then an optical fiber of which core diameter is 11.2 μm is produced by drawing and extending the produced glass preform 10.

Moreover, the annealing process is conducted to the drawn and extended optical fiber. Hereby K with which the core area was doped is dispersed. It was confirmed that, transmission loss of the optical fiber at a wavelength of 1550 nm is reduced from 0.169 dB/km which was obtained prior to the annealing process (Example 22-1) to 0.167 dB/km (Example 22-2). Other various conditions of Example 22 are shown in Table 2.

Hereafter, comparison examples will be explained for confirming effects of Examples 14 to 21 based on the above-described third embodiment and Examples 22-1 and 22-2 based on the fourth embodiment.

Comparison Example 3 will be explained at first. Comparison Example 3 uses a VAD device configured to be provided with only the burner 2 but not with the burners 3 and 4 of the VAD device shown in FIG. 1. Hereby a porous glass soot is produced in which the soot density makes no difference along the radial direction of the porous glass soot. Then a glass body is produced, while the porous glass soot is doped with K, by exposing the porous glass soot to an aerosol atmosphere including KCl in solid particle state in the vitrification furnace 6 shown in FIG. 8. In this case, since the soot density makes no difference along the radial direction of the porous glass soot, a porous glass is produced which is doped with potassium entirely. Properties and conditions of the produced porous glass are shown in Table 2.

Then, after further depositing the porous glass soot to the glass body, a glass preform is produced by conducting vitrification while doping with fluorine. In a region, of the glass preform, which is doped with fluorine, a relative refractive index difference with respect to a pure silica glass was −0.31%. Then, the outside vapor deposition step is conducted to form a glass while doping with fluorine to obtain similar refractive index. Hereby a glass preform was produced in which a ratio of an outer diameter of a region which is doped with K and an outer diameter of a region which is doped with F is 10.2:125. After that, the glass preform was drawn and extended to produce an optical fiber. In the produced optical fiber, a transmission loss at a wavelength of 1383 nm was extremely large, i.e., equal to or more than 3 dB/km. Other various conditions of Comparison Example 3 are similar to those shown in Table 2.

Hereafter Comparison Example 4 will be explained. In Comparison Example 4, an average soot density of an outer deposition soot was increased to 0.62 g/cm³ by increasing heating power of the burner 3 for forming the outer deposition soot by using the VAD device shown in FIG. 1.

Subsequently, after the porous glass soot produced in this manner is doped with potassium in the vitrification furnace 6 shown in FIG. 8, a glass body is produced by conducting the sintering-and-vitrifying step to the doped porous glass soot. As shown in Table 2, among various conditions for a produced glass body, a desirable relative refractive index difference between the inner glass portion and the outer glass layer could not be obtained when producing the optical fiber. Other various conditions of Comparison Example 4 are shown in Table 2.

Although the embodiments of the present invention were explained specifically heretofore, the present invention is not limited to the above-described embodiments, and various modifications are possible based on technical ideas of the present invention. For example, numbers and values described in the above-described embodiments and examples are mere samples, and when necessary, different numbers and values may be used.

Since the optical fiber produced in the above-described embodiments having little fluctuation in stress in the radial direction in and distortion is not limited to for use in optical transmission but also can be in other industrial use such as glass fiber.

Other soot-forming device can be used as the VAD device used in the above-described embodiments.

The present invention is capable of producing a glass preform in which a fluorine concentration of the cladding portion is higher than that of the core portion when synthesizing the core portion and the cladding portion together.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of producing a glass preform comprising:
    forming a porous glass soot configured by an inner deposition soot deposited on a start material and an outer deposition soot deposited outside the inner deposition soot, wherein soot densities are configured not to differ between the inner deposition soot and the outer deposition soot;
    doping only the inner deposition soot with an alkali metal element to an produce inner deposition soot doped with an alkali metal element;
    dehydrating, after the forming and before any sintering, the porous glass soot comprising the inner deposition soot doped with the alkali metal element at a predetermined temperature;
    contracting, after the dehydrating, the inner deposition soot doped with the alkali metal element by conducting a preliminary sintering at a temperature equal to or higher than the predetermined temperature at the dehydrating to increase the soot density of the inner deposition soot; and
    sintering, after the contracting, the porous glass soot while doping with fluorine to form a glass body including an inner glass portion and an outer glass layer, wherein an amount of the fluorine, with which the inner deposition soot is doped at the sintering, is equal to or more than 0 g/cm³ and less than an amount of the fluorine with which the outer deposition soot is doped.

2. The method of producing the glass preform according to claim 1, wherein, at the contracting, an average soot density of the inner deposition soot is made equal to or more than 0.7 g/cm³ and equal to or less than 1.7 g/cm³.

3. The method of producing the glass preform according to claim 1, wherein, at the doping, the inner deposition soot is doped with the alkali metal entirely by exposing the porous glass soot to an atmosphere in which the alkali metal element is in an aerosol state.

4. The method of producing the glass preform according to claim 1, wherein the alkali metal element is lithium (Li), potassium (K), sodium (Na), rubidium (Rb), or cesium (Cs).

5. The method of producing the glass preform according to claim 1, wherein a concentration of the alkali metal element with which the inner deposition soot is doped is equal to or more than 10 wtppm and equal to or less than 10000 wtppm.

6. The method of producing the glass preform according to claim 1, wherein a concentration of the alkali metal element with Which the inner deposition soot is doped is equal to or more than 10 wtppm and equal to or less than 5000 wtppm.

7. The method of producing the glass preform according to claim 1, wherein an average soot density of the outer deposition soot is equal to or more than 0,15 $g/cm^3$ and less than 0.7 $g/cm^3$.

8. The method of producing the glass preform according to claim 1, wherein an outer diameter of the outer glass layer is made equal to or more than twice an outer diameter of the inner glass portion and equal to or less than 4.5 times the outer diameter of the inner glass portion.

9. The method of producing the glass preform according to claim 1, wherein an outer diameter of the outer glass layer is made equal to or more than three times an outer diameter of the inner glass portion and equal to or less than 4.5 times the outer diameter of the inner glass portion.

10. The method of producing the glass preform according to claim 1, further comprising:
    depositing a second porous glass layer on an outer periphery of the glass body;
    vitrifying the second porous glass layer; and
    producing a glass preform.

11. The method of producing the glass preform according to claim 1, wherein the temperature for conducting the preliminary sintering when contracting the inner deposition soot is 1100° C. - 1250° C.

* * * * *